(12) United States Patent
Kim et al.

(10) Patent No.: US 6,438,119 B1
(45) Date of Patent: Aug. 20, 2002

(54) DATA COMMUNICATION DEVICE AND METHOD FOR MOBILE COMMUNICATION SYSTEM WITH DEDICATED CONTROL CHANNEL

(75) Inventors: Young-Ky Kim; Jae-Min Ahn; Soon-Young Yoon; Hee-Won Kang; Hyun-Suk Lee; Jin-Soo Park; Min-Sou Lee, all of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/250,662

(22) Filed: Feb. 16, 1999

(51) Int. Cl.⁷ .............................. H04B 7/26; H04J 3/16
(52) U.S. Cl. ...................... 370/335; 370/342; 370/470; 375/130; 714/754; 714/758
(58) Field of Search ................................. 370/335, 342, 370/441, 470, 479; 714/752, 754, 758, 764, 765, 768; 375/130, 135, 136, 146, 147

(56) References Cited

U.S. PATENT DOCUMENTS 5,511,073 A * 4/1996 Padovani et al. ........... 370/471
5,896,374 A * 4/1999 Okumura et al. ........... 370/342
6,005,855 A * 12/1999 Zehavi et al. ............... 370/335

* cited by examiner

*Primary Examiner*—Alpus H. Hsu
*Assistant Examiner*—Afsar M. Qureshi
(74) *Attorney, Agent, or Firm*—Dilworth & Barrese, LLP

(57) ABSTRACT

A CDMA communication system provides a dedicated control channel capable of efficiently communicating control messages between a base station and a mobile station. In a dedicated control channel transmission device, a controller determines a frame length of a message to be transmitted and outputs a frame select signal corresponding to the determined frame length. A message generator generates frame data of the message to be transmitted according to the frame select signal. A transmitter spreads the frame data and transmitting the spread frame data through a dedicated control channel. In a dedicated control channel reception device, a despreader despreads a received signal. A first message receiver deinterleaves and decodes the despread signal in a first frame length to output a first message, and detects a first CRC corresponding to the decoded signal. A second message receiver deinterleaves and decodes the despread signal in a second frame length to output a second message, and detects a second CRC corresponding to the decoded signal. A controller selects one of the first and second messages according to first and second CRC detection results.

29 Claims, 18 Drawing Sheets

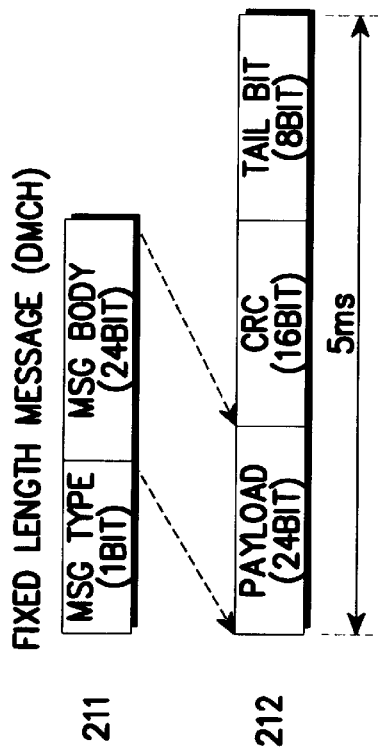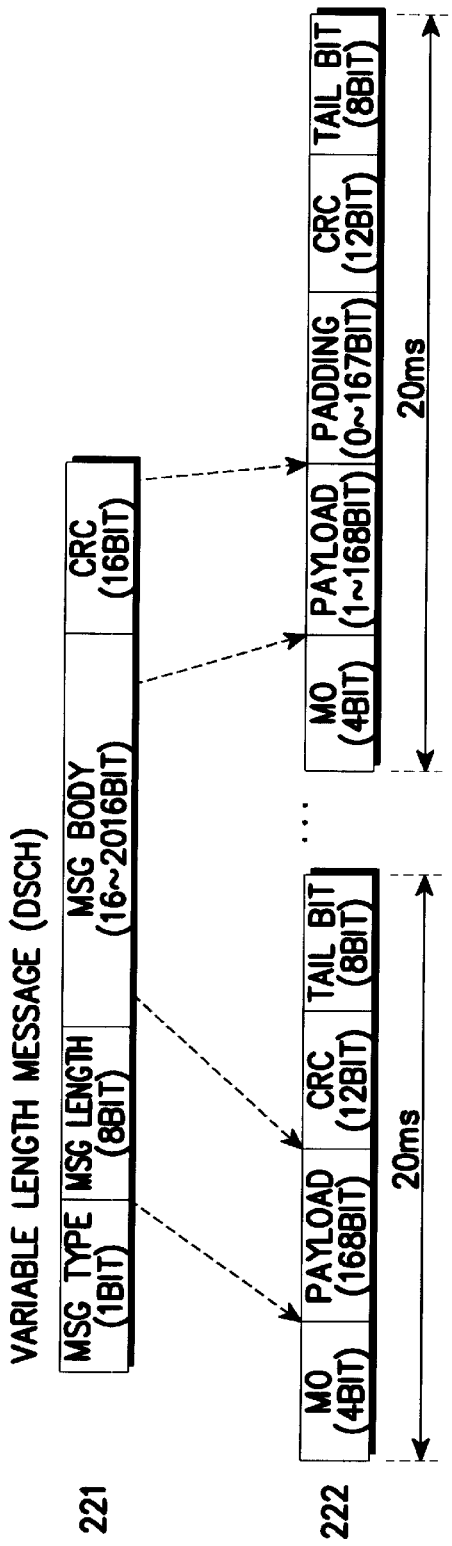
FIG. 2A
FIG. 2B

DATA COMMUNICATION DEVICE AND METHOD FOR MOBILE COMMUNICATION SYSTEM WITH DEDICATED CONTROL CHANNEL

BACKGROUND OF THE INVENTION

1. Field of the Invention

The present invention relates to a data communication device and method for a mobile communication system. More particularly, the invention relates to a device and method for communicating control information for a data communication service using a dedicated control channel in a mobile communication system which provides multimedia data communication service.

2. Description of the Related Art

At present, mobile communication systems using CDMA (Code Division Multiple Access) technology have become increasingly widespread. Conventional CDMA mobile communication systems based on the TIA/EIA IS-95 CDMA standard, transmit control signals for call processing multiplexed with data on a traffic channel carrying voice information. The traffic channel has a fixed frame length of 20 ms. Control signals may be transmitted as messages on dedicated frames by a blank-and-burst technique, or on a (frame shared with main user traffic by a dim-and-burst technique.

CDMA communication systems that provide multimedia services including packet data service as well as voice service are coming of age. These new systems may separate channels for the voice and data services to flexibly allocate the channels at the users' request. To this end, the CDMA mobile communication system includes a voice traffic channel (or fundamental channel) and a packet traffic channel (or supplemental channel).

Conventionally, for the data service through the fundamental channel and the supplemental channel, the CDMA mobile communication system typically maintains use of the fundamental channel to transmit the control signal, even in a state where there is no communication between the base station and mobile station. This results in a waste of channel resources, thereby limiting radio capacity. In addition, the conventional CDMA mobile communication system uses the fixed single frame length of 20 ms without regard to the size of a message to be transmitted, which may cause low throughput and traffic delays.

SUMMARY OF THE INVENTION

It is, therefore, an object of the present invention to provide a dedicated control channel structure capable of efficiently communicating a control message between a base station and a mobile station, a call control message of an upper layer and a control message for connection of a packet traffic channel, by providing a dedicated control channel by which the mobile station can exclusively communicate the control signal to the base station in a CDMA mobile communication system, and a method for operating the same.

It is another object of the present invention to provide a device and method for generating and communicating a control message having a variable frame length according to the size of the control message in a CDMA mobile communication system using a dedicated control channel.

It is still another object of the present invention to provide a device and method for adaptively and intermittently communicating a control message on a dedicated control channel according to the presence/absence of the control message in a mobile communication system using the dedicated control channel.

It is a further object of the present invention to provide a frame data processing device and method, in which a reception device receives frame data transmitted in a discontinuous transmission mode, detects an energy level of the received frame data and determines presence/absence of an effective frame so as to process the frame data according to the determination.

It is yet another object of the present invention to provide a frame data processing device and method, in which a receiver receives frame data transmitted in a discontinuous transmission mode, detects an energy level of the received frame data and determines presence/absence of an effective frame, so as to process the received frame data according to a frame detection result and an error detection result.

To achieve the above and other objects, in one aspect of the invention there is a CDMA system-for transmitting messages having at least two different frame lengths. The system includes: a controller that determines a frame length of a message to be transmitted and outputs a frame select signal corresponding to the determined frame length; at least one message generator for generating frame data of the message to be transmitted according to the frame select signal; and a transmitter for spreading the frame data and transmitting the spread frame data through a dedicated control channel.

The message generator may include a Cyclic Redundancy Check (CRC) generator for generating CRC bits for the message in the frame length determined according to the frame select signal and adding the CRC bits to the message, a tail bit generator for generating tail bits and adding the generated tail bits to an output of the CRC generator, a channel encoder for encoding the tail bit-added frame data with a predetermined encoding rate; and an interleaver for interleaving the encoded message by a unit of the frame length determined according to the frame select signal.

The system may include as many message generators as the number of frame lengths of the message to be transmitted. The respective message generators generate the frame data in the corresponding frame length.

The controller may be adapted to generate an output control signal to implement a discontinuous transmission mode when there is no message to transmit. The transmitter preferably includes a path controller for controlling an output of the dedicated control channel in response to the output control signal. The path controller may comprise a gain controller whose output gain becomes zero in response to the output control signal.

In accordance with another aspect of the present invention, there is provided a CDMA system that receives messages having at least two different frame lengths. This system includes: a despreader for despreading a signal received through a dedicated control channel; a first message receiver for deinterleaving and decoding the despread signal in a first frame length to output a first message, and detecting a first CRC corresponding to the decoded signal; a second message receiver for deinterleaving and decoding the despread signal in a second frame length to output a second message, and detecting a second CRC corresponding to the decoded signal; and a controller for selecting one of the first and second messages according to first and second CRC detection results by the first and second message receivers.

The controller may include a frame decider for analyzing the first and second CRC detection results to decide a frame length of the received message and output a frame length decision signal, and a selector for selecting one of the decoded signals output from the first and second message receivers according to the frame decision signal.

In accordance with still another aspect of the present invention, a CDMA system that receives messages having at least two different frame lengths includes: a despreader for despreading a signal received through a dedicated control channel; a frame detector for detecting energy of the despread signal in first and second frame lengths and outputting first and second frame detection signals according to the detection results; a first message receiver for deinterleaving and decoding the despread signal in the first frame length to output a first message; a second message receiver for deinterleaving and decoding the despread signal in the second frame length to output a second message; and a controller for selecting one of the first and second messages according to the first and second detection results.

The frame detector may include first and second frame detectors. The first frame detector has as a reference value a minimum energy value of a 5 ms effective frame and compares an energy value of the received frame message with the minimum energy value of the 5 ms effective frame to generate a first frame detection signal when the energy value of the received frame message is higher than the minimum energy value of the 5 ms effective frame. The second frame detector has as a reference value a minimum energy value of a 20 ms effective frame and compares an energy value of the received frame message with the minimum energy value of the 20 ms effective frame to generate a second frame detection signal when the energy value of the received frame message is higher than the minimum energy value of the 20 ms effective frame.

In accordance with a further aspect of the present invention, a CDMA system that receives messages having at least two different frame lengths includes: a despreader for despreading a signal received through a dedicated control channel; a first frame detector for detecting an energy of the despread signal in a first frame length to output a first frame detection signal according to the detection result; a second frame detector for detecting energy of the despread signal in a second frame length to output a second frame detection signal according to the detection result; a first message receiver for deinterleaving and decoding the despread signal in the first frame length to output a first message and detecting a first CRC corresponding to the decoded signal to output a first CRC detection signal; a second message receiver for deinterleaving and decoding the despread signal in the second frame length to output a second message and detecting a second CRC corresponding to the decoded signal to output a second CRC detection signal; and a controller for selecting one of the first and second messages according to the first and second frame detection results and the first and second CRC detection results.

The controller includes a frame decider and a selector. The frame decider analyzes the first and second CRC detection signals and the first and second frame detection signals, judges the received frame to have the second frame length when the second CRC detection signal and the second frame detection signal are received, judges the received frame to have the first frame length when the first CRC detection signal and the first frame detection signal are received, and judges the received frame to be an error frame when other CRC and frame detection signals are received. The selector outputs a corresponding one of the decoded signals output from the first and second message receivers upon receiving one of first and second frame length decision signals, and controls an output of the decoded signal upon reception of an error frame decision signal. In addition, the frame decider determines that no frame is received when none of the first and second frame detection signals and none of the first and second CRC detection signals are received.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings:

FIG. 2A is a diagram illustrating a structure of a first length frame for a dedicated control channel according to the present invention;

FIG. 2B is a diagram illustrating a structure of a second length frame for the dedicated control channel according to the present invention;

DETAILED DESCRIPTION OF THE PREFERRED EMBODIMENT

Figure 1A:
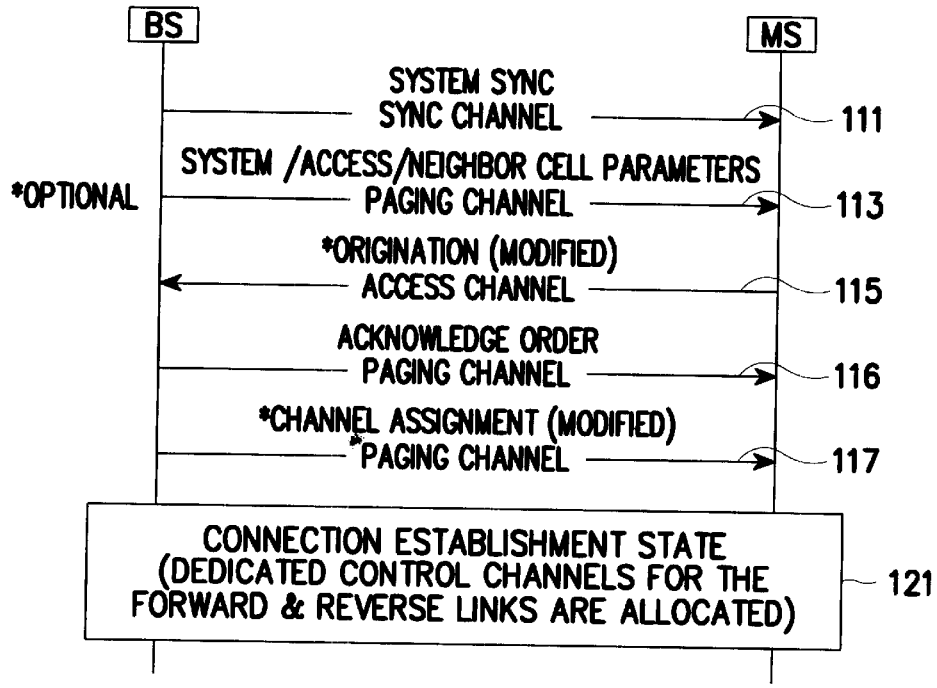
FIG. 1A is a flow diagram illustrating a call setup procedure.

A CDMA mobile communication system according to the present invention includes a dedicated control channel (DCCH) by which a mobile station can exclusively communicate a control signal to a base station. The DCCH is dedicated for control signal communication with one mobile station at a time, rather than being simultaneously shared among a number of mobile stations. In particular, the dedicated control channel is used in exchanging the signals for controlling connection of the traffic channel.

In accordance with the invention, when communicating a control signal using the dedicated control channel, the novel CDMA mobile communication system uses different-sized frames according to the size of the control signal. For a short control signal, the system generates and transmits a frame of a first length; for a long control signal, the system generates and transmits a frame of a longer length.

In addition, the CDMA mobile communication system controls (restrains) the output of the dedicated control channel when there is no control message to be transmitted. When a control message does exist, an output path is formed for the dedicated control channel.

The dedicated control channel is used for exchanging the messages that control connection of the traffic channel between the base station and the mobile station. Prior to describing the structure of the dedicated control channel, the channels used in the novel CDMA mobile communication system and their uses will first be discussed. In the forward link, which is an RF (radio frequency) link for transmitting signals from the base station to the mobile station, the common channels include a pilot channel, a sync channel and a paging channel (or a common control channel), and the user channels include a dedicated control channel, a voice traffic channel and a packet traffic channel. In the reverse link which is an RF link for transmitting signals from the mobile station to the base station, the common channel includes an access channel (or a common control channel) and the user channels include a pilot channel, a dedicated control channel, a voice traffic channel and a packet traffic channel.

Thus, a channel transceiver device for the base station and a channel receiver device for the mobile station in the present embodiment each include transceiver circuitry for transmitting and/or receiving the following information in the respective channels: 1) pilot channel information used for estimating the channel gain and phase and performing cell acquisition and handoff; 2) paging channel information for performing initial synchronization and providing base station information and neighbor cell information; 3) access channel information; 4) voice data in the dedicated fundamental channel; 5) packet data in the dedicated supplemental channel; and 6) dedicated control channel information including setup/release and communication state-related control messages for the dedicated fundamental channel and the dedicated supplemental channel.

Table 1 shows uses of the respective channels for the forward link and the reverse link according to the services provided.

TABLE 1

| Service | Forward Link Channel | Reverse Link Channel |
| --- | --- | --- |
| Voice Service | Pilot Channel | Pilot Channel |
| | Voice Traffic Channel | Voice Traffic Channel |
| High Quality Voice Service | Pilot Channel | Pilot Channel |
| | Voice Traffic Channel | Voice Traffic Channel |
| | Dedicated Control Channel | Dedicated Control Channel |
| High Speed Packet Data Service | Pilot Channel | Pilot Channel |
| | Packet Traffic Channel | Packet Traffic Channel |
| | Dedicated Control Channel | Dedicated Control Channel |
| Multimedia Service | Pilot Channel | Pilot Channel |
| | Voice Traffic Channel | Voice Traffic Channel |
| | Packet Traffic Channel | Packet Traffic Channel |
| | Dedicated Control Channel | Dedicated Control Channel |
| | Paging Channel (Common Control Channel) | Access Channel (Common Control Channel) |
| Short Message Service | Pilot Channel | Pilot Channel |
| | Paging Channel (Common Control Channel) | Access Channel (Common Control Channel) |

The CDMA mobile communication system may have an idle mode, a voice mode (or voice traffic channel utilization mode), a packet reservation mode (or packet traffic channel utilization mode) and a combined mode of the above-mentioned modes according to the service states. The dedicated control channel is preferentially used for a call providing a service for the packet reservation mode (i.e., a service using the packet traffic channel) among the above-mentioned modes. For this case, the dedicated control channel is allocated to the mobile stations using the packet data service. As an alternative, however, the dedicated control channel may be used together with the voice traffic channel for high quality voice service. In this scenario, the dedicated control channel can be shared by several mobile stations, instead of being exclusively used by a particular mobile station.

The call processing for the packet data service is preferably compatible with an IS-95 call processing method. During call setup for the packet data service, the IS-95 origination message and channel allocation message which are modified to support the packet data service are used; in call release for the packet data service, an IS-95 release order message modified to support the packet service is used. Exemplary call setup and call release procedures, performed at the request of the mobile station, are shown in FIGS. 1A and 1B, respectively.

Referring to the flow diagram of FIG. 1A, the base station (BS) transmits a system sync message in the sync channel to the mobile station (MS) in step 111. The base station also sends system, access channel and neighbor cell parameters to the mobile station through the paging channel in step 113. The mobile station then outputs an origination message via the access channel in step 115. The base station acknowledges the origination message via the paging channel in step 116, and allocates the traffic channels via the paging channel in step 117. When the traffic channels are assigned for communication between the base station and the mobile station, the system transitions to a connection establishment state in step 121, in which the dedicated control channels for the forward and reverse links are also allocated.

Figure 1B:
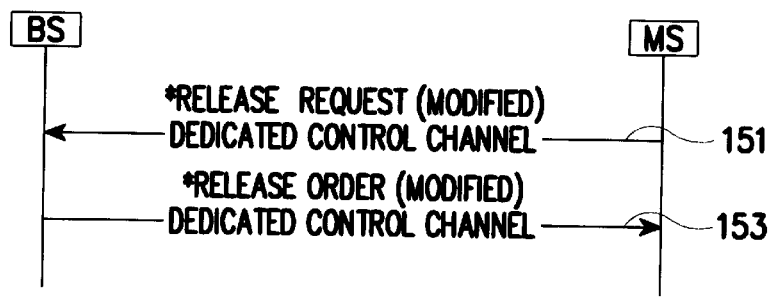
FIG. 1B is a flow diagram illustrating a call release procedure.

Referring to FIG. 1B, to release the call in the connection establishment state, the mobile station sends a control message for the call release request through the reverse dedicated control channel in step 151, and the base station then outputs a control message for the call release via the forward dedicated control channel in step 153.

As illustrated in FIGS. 1A and 1B, the differences between the message used in the call control procedure for the packet data service and the message of the IS-95 standard, are as follows: In the origination message (see step 115 of FIG. 1A), the packet data mode is added to the service option; in the channel assignment message (see step 117 of FIG. 1A), packet data control channel allocation information is added to the allocation mode and used as an allocation indicator for the dedicated control channel, and dedicated control channel-related information (a channel identifier and a channel parameter) is included in an annexed field. Further, in the release order message (see step 153 of FIG. 1B), the dedicated control channel-related information is included in the annexed field. Since the dedicated control channel is not yet established in the connection establishment procedure, the call setup-related messages are transmitted through the IS-95 channels (i.e., the sync, the paging and the access channels). Once the dedicated control channels for the forward and the reverse links are established by means of the call setup-related messages, the call control messages (e.g., the call release message) are transmitted through the dedicated control channel.

For the purpose of explication, it is assumed that the dedicated control channel of the present embodiment has the following characteristics: a data rate of 9.6 Kbps, a frame length of 5 ms or 20 ms, and a frame Cyclic Redundancy Check (CRC) consisting of 16 bits (for the 5 ms frame) or 12 bits (for the 20 ms frame). Further, in a user mode, which is not a common mode, several dedicated control channels are employed. The dedicated control channels operate only in a competitive transmission mode, not a reserved transmission mode. In the following description, the frame length 5 ms is called a first length of the frame and the frame length 20 ms is called a second length of the frame.

Figure 2C:
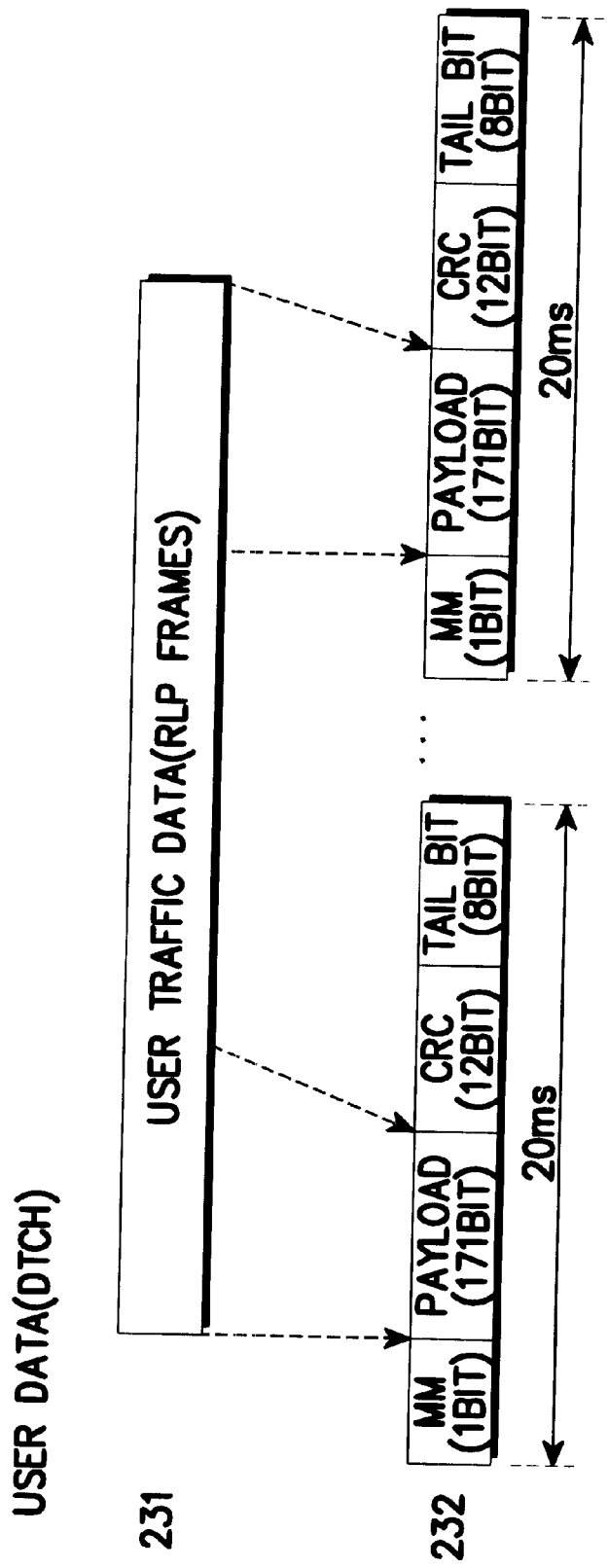
FIG. 2C is a diagram illustrating a structure of a second length traffic frame for the dedicated control channel according to the present invention.

FIGS. 2A, 2B and 2C illustrate frame structures of a first length frame, a second length control data frame, and a second length traffic data frame, respectively. The first length frame of FIG. 2A is 5 ms in duration. Reference numeral 211 denotes a 24 bit fixed length message body frame of an upper layer, preceded by a 1 bit message type flag. Reference numeral 212 denotes a first length frame communicated in a physical layer (i.e., the data bits of frame 212 are wirelessly transmitted). Frame 212 is composed of a 24 bit payload field, a 16 bit CRC field and an 8 bit tail bit field. The information of the 24 bit message body segment of frame 211 in the upper layer is placed in the 24 bit payload frame segment of frame 212 of the physical layer. The fixed length message may be a DMCH (Dedicated MAC (Medium Access Control) Channel) message, a DSCH (Dedicated Signaling Channel) message, or another type of message.

FIG. 2B illustrates the second length frame (20 ms duration), in which reference numeral 221 denotes a variable length control message of the upper layer and reference numeral 222 denotes a sequence of second length (20 ms) control message frames wirelessly communicated in the physical layer. The variable length message may be the DSCH message. The data within the variable length message body of the DSCH message is distributed in the payload segments of the 20 ms frames. The payload segment of each 20 ms frame in the sequence, except for the last 20 ms frame, is 168 bits. The payload segment of the last 20 ms frame can be anywhere between 1 and 168 bits long. Thus, the number of 20 ms frames in the transmitted sequence depends on the number of bits in the message body of the upper layer message.

FIG. 2C illustrates a second length traffic frame of 20 ms period, in which reference numeral 231 denotes a traffic structure of the upper layer and reference numeral 232 denotes a second length traffic frame communicated in the physical layer. The traffic may be Dedicated Traffic Channel (DTCH) traffic. The user traffic data is distributed among the payload portions of the 20 ms traffic frames in a similar manner as the control message data of FIG. 2B.

The dedicated traffic channel has the functions of delivering packet data service-related control messages (e.g., a packet traffic channel allocation message, a layer 3 control message, etc.), delivering the IS-95 control message by encapsulating, delivering a short user packet, and transmitting a power control bit (PCB) through the forward link.

In order to increase the throughput of the CDMA mobile communication system, the frame length of the dedicated control channel is allowed to vary. In particular, a frame length obtained by dividing a reference frame length by an integer should be used to improve the throughput. For example, when the reference frame length is 20 ms, it is preferable to design the system to be able to use a 5 ms or 10 ms frame. In the present embodiment, it is assumed that the 5 ms frame is used. In this way, it is possible to increase the throughput and decrease the traffic delay, as compared with the case where the 20 ms frame shown in FIG. 2B is used.

Figure 3A:
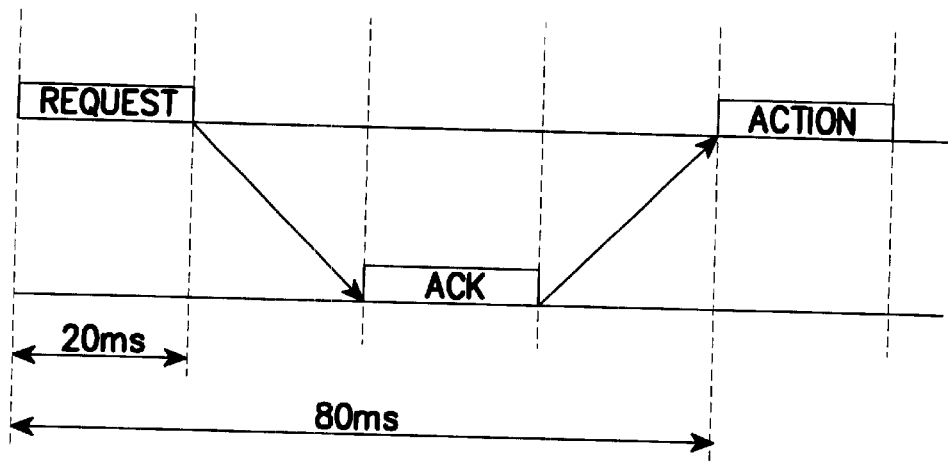
FIG. 3A is a timing diagram illustrating a transmission time when the second length frame is used for the dedicated control channel in a mobile communication system according to the present invention.
Figure 3B:
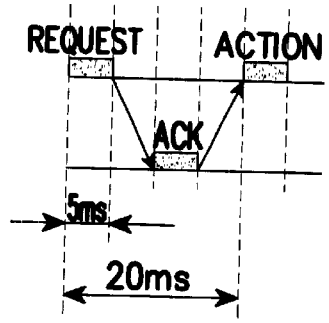
FIG. 3B is a timing diagram illustrating a transmission time when the first length frame is used for the dedicated control channel in the mobile communication system according to the present invention.

FIG. 3A illustrates a transmission time interval for the second length frame (i.e., 20 ms frame), and FIG. 3B illustrates a transmission time interval for the first length frame (i.e., 5 ms frame). The time required to send a request message through the dedicated control channel and take corresponding action after reception of an acknowledge, is 80 ms as shown in FIG. 3A when the 20 ms frame is used, and is 20 ms, which is one quarter of 80 ms, as shown in FIG. 3B when the 5 ms frame is used. Of course, the latter represents the case where the respective messages are so short as to be loaded into the 5 ms frame, i.e., where the maximum gain in throughput can be obtained with the 5 ms frame. Here, the reason that the throughput is increased is because the signals are efficiently transmitted, thereby increasing the time in which the actual user data can be transmitted.

In the present embodiment, the dedicated control channel is used in a control hold state and an active state out of the states for performing the procedures for the packet data service. Shown in Table 2 is the relationship between the "logical" channels and the "physical" channels for the forward and the reverse links. The physical channels are the channels that are wirelessly transmitted. The data carried by the physical channels is derived from the respective logical channels.

TABLE 2

| | Forward Link | | Reverse Link | |
| --- | --- | --- | --- | --- |
| | Logical CH | Physical CH | Logical CH | Physical CH |
| Control Hold State | DMCH DSCH | Dedicated Control CH | DMCH DSCH | Dedicated Control CH |
| Active State | DMCH DSCH DTCH | Dedicated Control CH | DMCH DSCH DTCH | Dedicated Control CH |
| | DTCH | Packet Traffic CH | DTCH | Packet Traffic CH |

In Table 2, the dedicated MAC channel (DMCH) is a forward or reverse channel necessary for transmission of a Medium Access Control (MAC) message, and is a one-to-one channel allocated in the control hold state and the active state for the packet service. The message of the dedicated MAC channel in the logical channel essentially becomes the message of the dedicated control channel in the physical layer. The dedicated signaling channel (DSCH) is a forward or reverse channel necessary for transmission of the layer 3 signaling message, and is a one-to-one channel (i.e., unshared channel) allocated in the control hold state and the active state for the packet service. The dedicated traffic channel (DTCH) is a forward or reverse channel necessary for transmission of the user data, and is a one-to-one channel allocated in the active state for the packet service.

The control hold state in Table 2 means a state where although the dedicated MAC channel DMCH and the dedicated signaling channel DSCH are allocated to the forward and reverse links, an RLP (Radio Link Protocol) frame with the user data packet cannot be exchanged because the dedicated traffic channel DTCH is unestablished. In addition, the active state means a state where the channels DMCH, DSCH and DTCH are allocated to the forward and reverse links so that the RLP frame with the user data packet can be exchanged.

Thus, FIGS. 2A to 2C show the logical channel message frames or data mapped into the physical channel frames. In those figures, reference numerals 211, 221 and 231 denote the logical channel message frames, and reference numerals 212, 222 and 232 denote the physical channel message frames.

The ensuing discussion relates to the structures and operations of the first length frame and the second length frame for the dedicated control channel. The frame length of the dedicated control channel varies dynamically according to the type of the message. At the receiver, the frame length is determined every 5 ms.

In a packet channel connection control mode for transmitting the fixed length message of 5 ms shown in FIG. 2A, request/allocation for the forward and reverse packet traffic channels is made using a 5 ms request/acknowledge message. The forward packet traffic channel allocation which begins at the base station is independent of the reverse packet traffic channel allocation which begins at the mobile station. The connection control messages include a packet traffic channel request message, a packet traffic channel allocation message and a packet traffic channel acknowledge message. These messages are transmitted through the DMCH among the logical channels. Table shows channel allocation message fields for the reverse packet traffic channel, for the first length frame of 5 ms.

TABLE 3

Reverse Packet Traffic Channel Allocation Message (24 bits)

| Field | Length (bits) |
|---|---|
| Header Information | 5 |
| Sequence | 3 |
| Start Time | 2 |
| Allocated Rate | 4 |
| Allocated Duration | 3 |
| Reserved Bits | 7 |

In Table 3, the respective fields are defined as:
"Header Information"—identifier, direction and type (i.e., request and acknowledge) of the message
"Sequence"—sequence of the message
"Start Time"—channel using start time
"Allocated Rate"—rate of the allocated channel
"Allocated Duration"—channel using duration for the allocated channel The 24-bit fixed length message in the form of Table 3 is transmitted with the 5 ms frame, shown in FIG. 2A, of the dedicated control channel.

Figure 4:
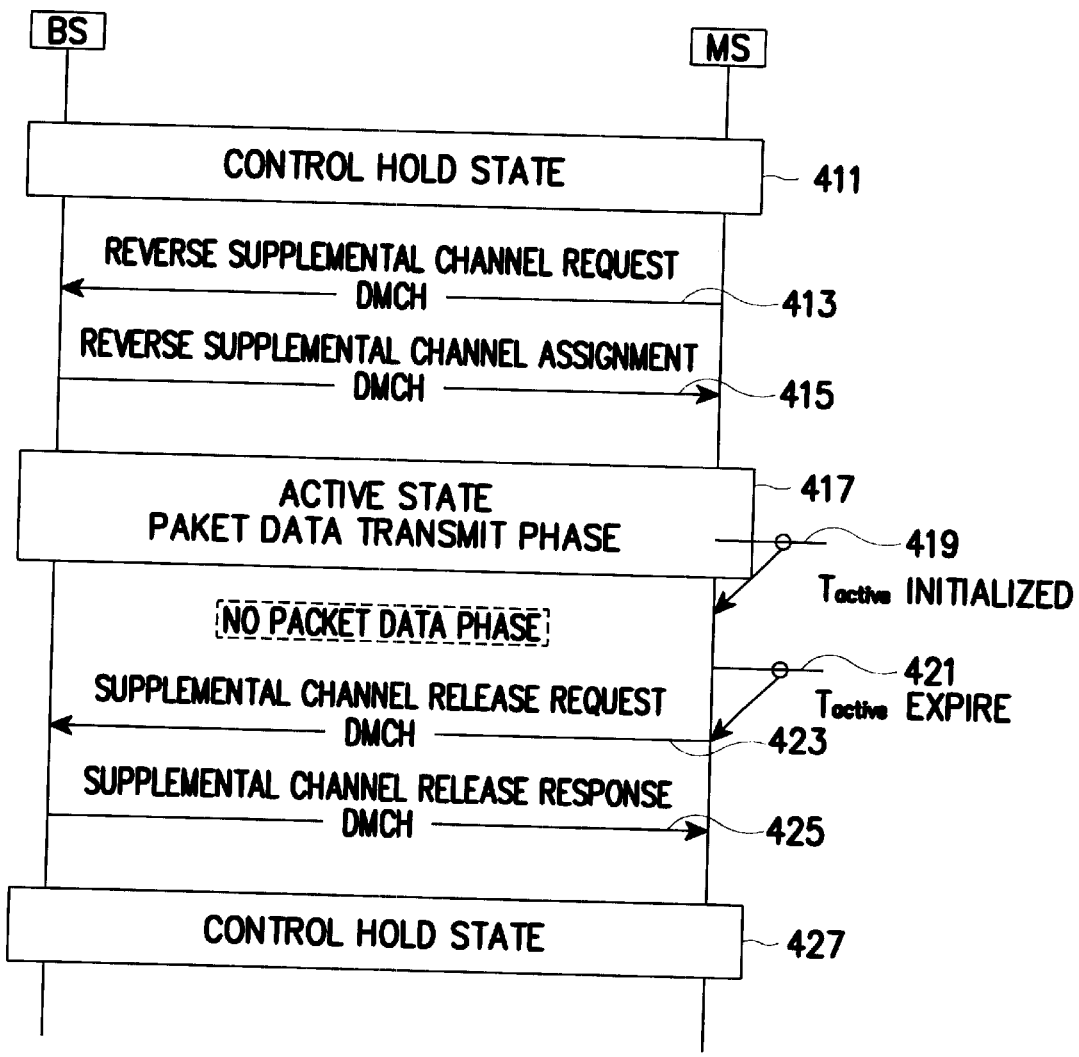
FIG. 4 is a flowchart illustrating allocation and release procedures for a dedicated control channel and a dedicated traffic channel in the mobile communication system according to the present invention.

FIG. 4 is a flowchart illustrating a procedure for allocating and releasing the packet traffic channel through the dedicated control channel, while the system transitions from the control hold state to the active state and then transitions again from the active state to the control hold state. It is assumed in step 411 that the base station and the mobile station maintain the control hold state in which the dedicated control channel is connected. In this state, the mobile station generates a control message for requesting allocation of the reverse packet traffic channel through the dedicated MAC channel DMCH and sends it through the physical channel, in step 413. The base station then generates a control message for allocating the reverse packet traffic channel via the dedicated MAC channel DMCH and sends the generated control message via the physical channel, in step 415. Then, the base station and the mobile station transition to the active state where the packet traffic channel is allocated to communicate the packet data, in step 417. In this active state, the mobile station initializes a $T_{active}$ timer in step 419 to check the time at which transmission of the packet data is discontinued. Here, if transmission of the packet data is continued before a value of the $T_{active}$ timer expires, the active state is maintained and then the step 419 is repeated to initialize the $T_{active}$ timer.

However, if transmission of the packet data is not continued until the value of the $T_{active}$ timer expires, the mobile station perceives this in step 421, and generates a control message for requesting release of the reverse packet traffic channel through the dedicated MAC channel DMCH and sends the generated control message through the physical channel, in step 423. In response to the control message, the base station generates a response control message for release of the reverse packet traffic channel via the dedicated MAC channel DMCH and sends the generated control message via the physical channel, in step 425. Subsequently, the base station and the mobile station release the reverse traffic channel and transition to the control hold state, in step 427, preparing for the next state.

As illustrated in FIG. 4, in the procedure of requesting and allocating the reverse packet traffic channel, the mobile station generates the reverse packet traffic channel request message including the requested channel data rate information and sends it to the base station. The base station then analyzes the received message to determine whether or not the requested parameter can be supported and sends, in response to the request message, the reverse packet channel allocation control message of Table 3 to the mobile station according to the determination. When an additional negotiation is required, the above-mentioned request and response procedures may be repeated. Further, if there is no packet data to transmit during the packet data communication, the packet traffic channel releasing process is performed after a lapse of the time set in the $T_{active}$ timer.

In a transmission mode for the variable length frame, the variable length message according to the IS-95 standard is divisionally loaded into the 20 ms frames of the dedicated control channel, as shown in FIG. 2B. Specifically, the transmission modes may include a mode for transmitting the frame without error detection and correction by ACK/NACK (acknowledge/negative acknowledge), a mode where ACK/NACK occurs when an entire variable length message is received and retransmission is performed for the entire variable length message, and a mode where ACK/NACK is performed for the respective frames.

In a user data transmission mode, the RLP frames with the user traffic is divisionally loaded into the 20 ms frames of the dedicated control channel, as shown in FIG. 2C. The user data transmission mode can be used in the event that it is inefficient to establish the packet traffic channel for transmitting the data because there is a small amount of the data to transmit.

An embodiment of a physical device for transmitting the frames of the dedicated control channel in the CDMA mobile communication system using the dedicated control channel described above will now be described.

Figure 5A:
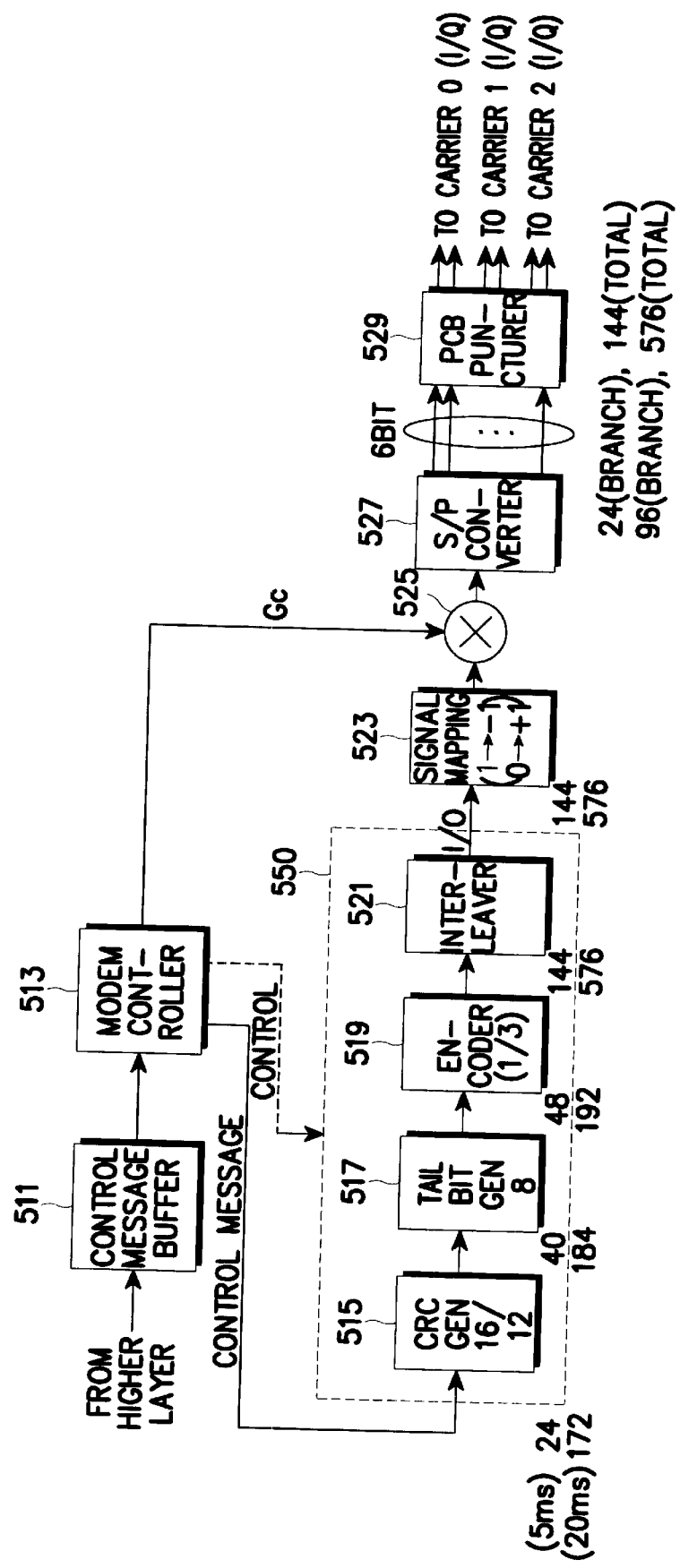
FIGS. 5A and 5B are diagrams illustrating a transmission device for a forward dedicated control channel in a mobile communication system according to the present invention.
Figure 5B:
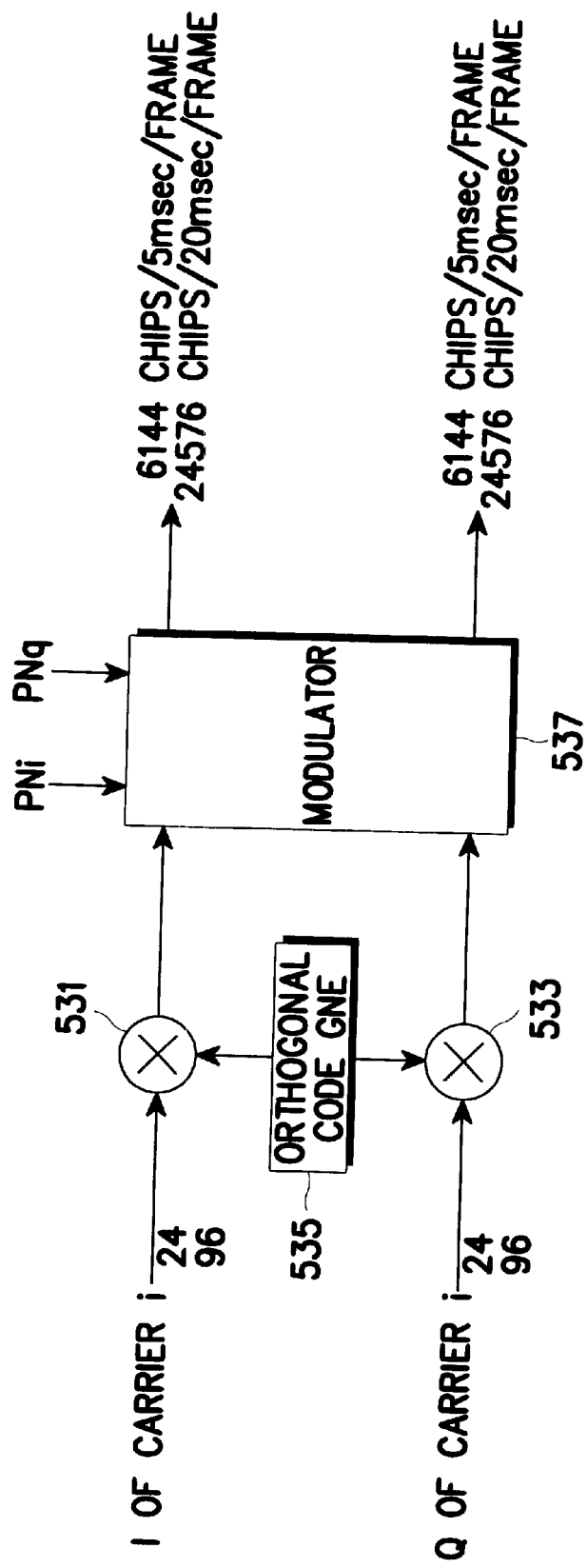

Referring to FIGS. 5A and 5B, a frame transmission device for the forward dedicated control channel is depicted. A control message buffer 511 temporarily stores a control message communicated through the dedicated control channel. The control message buffer 511 should have a proper size to store one or more second length frames of 20 ms. Further, the control message buffer 511 interfaces a control message between a higher layer processor (not shown) and a modem controller 513. The higher layer processor sets a flag after storing in the control message buffer 511 the control message with the header information for discriminating the 5 ms and 20 ms frames according to the message type, and the modem controller 513 clears the flag after reading the control message, so as to prevent over-writing and over-reading.

After reading the control message stored in the control message buffer 511, the modem controller 513 analyzes a header of the control message to detect a message type, outputs a message (or payload) to be transmitted through the dedicated control channel according to the detected message type, and outputs a control signal according to the detected message type. Here, the control signal generated from the modem controller 513 is a frame select signal for selecting the first and second length frames.

As for the message type, the control message may have a first control message of 5 ms shown in FIG. 2A or a second control message of 20 ms shown in FIG. 2B, and the size of the control data output from the modem controller 513 depends on the analysis result. That is, for the 5 ms control message, the modem controller 513 outputs 24-bit data having the structure of Table 3; for the 20 ms control message, the modem controller 513 outputs 172-bit data. Further, the modem controller 513 determines absence/presence of the control message to control an output of the dedicated control channel. That is, the modem controller 513 generates a first gain control signal when there is a control message to transmit, and generates a second gain control signal for repressing (checking) a signal transmitted to the dedicated control channel when there is no control signal to transmit. Here, the gain control signals are output control signals for controlling transmission output of the dedicated control channel. Although the present invention has been described with reference to an embodiment having the gain controller placed at a pre-stage of a spreader, it is also possible to place the gain controller at a following stage of the spreader.

A CRC (Cyclic Redundancy Check) generator 515 adds CRC bits to the control message output from the modem controller 513 to render it possible to determine the frame quality (i.e., determine whether or not the frame has an error) at the receiver. Specifically, for the 5 ms frame, the CRC generator 515 generates 16-bit CRC to output a 40-bit control message, under the control of the modem controller 513; for the 20 ms frame, the CRC generator 515 generates 12-bit CRC to output a 184-bit control message.

A tail bit generator 517 generates tail bits necessary for termination of an error correction code. This tail bit generator 517 analyzes an output of the CRC generator 515 to generate the tail bits according to the analysis and adds the generated tail bits to the output of the CRC generator 515. Specifically, the tail bit generator 517 generates 8 tail bits and adds them to the output of the CRC generator 515. Therefore, for the 5 ms control message, the control message output from the tail bit generator 517 is composed of 48 bits as represented by reference numeral 212 of FIG. 2A. Further, for the 20 ms control message, the control message output from the tail bit generator 517 is composed of 192 bits as represented by reference numeral 222 of FIG. 2B.

An encoder 519 encodes an output of the tail bit generator 517. The encoder 519, used in the embodiment, is a convolutional encoder or a turbo encoder using an encoding rate $1/3$. An interleaver 521 interleaves encoded control data output from the encoder 519. That is, the interleaver 521 changes arrangement of the bits within the frame by the frame unit of the message, so as to improve a tolerance for a burst error.

The CRC generator 515, the tail bit generator 517, the encoder 519 and the interleaver 521 constitute a control message generation block 550 for generating the control message and transmitting the generated control message via the physical channel. FIG. 5A shows, by way of example, the structure in which the control message generation block 550 processes the control messages of both the 5 ms and 20 ms frames. However, it is also possible to include the control message generation blocks as many as the number of the frame sizes of the control message processed in the dedicated control channel, and generate the control message by selecting the control message generation block corresponding to the length of the frame to be transmitted by the modem controller 513. In this case, the respective control message generation block should include the CRC generator, the tail bit generator, the encoder and the interleaver according to the frame length of the corresponding control message.

A signal mapping block 523 converts a transmission signal by converting a transmission signal of the logic "1" to "−1" and a transmission signal of the logic "0" to "+1". A gain controller 525, a gain multiplier, forms or blocks a path for the control message, being transmitted, of the dedicated control channel according to a gain control signal Gc output from the modem controller 513. That is, the gain controller 525 performs a DTX (Discontinuous Transmission) mode of operation, in which the path of the dedicated control channel is formed according to the gain control signal when there is the control message to transmit, and the path of the dedicated control channel is blocked when there is no control message to transmit.

A serial-to-parallel (S/P) converter 527 multiplexes symbols of the control message, output from the gain controller 525, to distribute them to spreaders for the corresponding carriers. Here, in the embodiment, 3 carriers are used, by way of example. In this case, there exist 3 carrier channels each having two phase branches (i.e., I and Q branches). Therefore, since the control message of the 5 ms frame is composed of 144 symbols, the number of the symbols output through the I and Q branches for the respective carriers is 24. Further, since the control message of the 20 ms frame is composed of 576 symbols, the number of the symbols output through the I and Q branches for the respective carriers is 96. Occasionally, the dedicated control channel transmitter may use a single carrier. In this case, the S/P converter 527 simply performs a symbol distribution function for the I and Q branches of the single carrier. A PCB (Power Control Bit) puncturer 529 punctures a control bit to be output to the mobile station via the forward link. Here, the control bit may be a power control bit PCB for controlling a reverse link power of the mobile station.

FIG. 5B illustrates a spreader for spreading the symbols output from the PCB puncturer 529. The embodiment includes the spreaders as many as the number of the carriers. For the convenience of explanation, FIG. 5B shows the structure of the spreader corresponding to a particular carrier. An orthogonal code generator 535 generates an orthogonal code used for the dedicated control channel. Here, the orthogonal code may be a Walsh code or a quasi-orthogonal code. Multipliers 531 and 533 multiply the orthogonal code output from the orthogonal code generator 535 by the corresponding I and Q branch signals, respectively, to output spread control signals for the forward link dedicated control channel. Although the invention has been described with reference to an embodiment which spreads the orthogonal code using BPSK (Bi-Phase Shift Keying) modulation, it is also possible to spread the orthogonal code using QPSK (Quadrature Phase Shift Keying) modulation.

A modulator 537 receives PN codes (Pseudo random Noise sequence) PNi and PNq output from a non-depicted PN sequence generator to spread the I and Q branch signals. For the modulator 537, a complex multiplier can be used.

When the quasi-orthogonal code is used, the number of the code channels can be extended at the expense of an FEC (Forward Error Correction) rate. Further, in the forward link, power fluctuation due to punctuation of the power control bit can be prevented through code bit level frame staggering.

In FIG. 5A, the frame length (5 ms or 20 ms) of the control message to be transmitted is determined in the modem controller 513. That is, the modem controller 513 determines the frame length by examining the header information representing whether the control message stored in the control message buffer 511 is a 24-bit fixed length control message or a variable length control message. When the header information represents the 24-bit fixed length control message, it is determined that the control message has the 5 ms frame length. When the header information represents the variable length control message, it is determined that the control message has the 20 ms frame length. The modem controller 513 generates a signal for controlling the control message generation block 550 according to the frame length determination. The numerals in sub-blocks 515, 517, 519 and 521 of the control message generating block 550 represent the bit numbers according to the frame lengths; for the 5 ms frame, the upper parameters are used, and for the 20 ms frame, the lower parameters are used. Thus, for example, for the 5 ms frame, CRC generator 515 generates 16 bits, but it only generates 12 bits for each 20 ms frame.

In addition, the modem controller 513 controls the dedicated control channel in the DTX mode. That is, in the preferred embodiment, the signaling message and the MAC-related message for the data service are transmitted/received through the dedicated control channel, contributing to an effective use of the channel capacity. The IS-95 system is structured to multiplex the voice traffic and the signaling traffic, so that the voice and signaling channels should be normally opened for the data service. However, since the dedicated control channel of the invention operates in the DTX mode, it is not necessary to normally open the channel for the control signal. When there is no signal information to transmit, it is possible to suppress a transmission power in a DTX gain controller, thus effectively utilizing the radio capacity.

As to the DTX transmission mode of operation, when it is perceived that the control message buffer 511 has no control message to transmit, the modem controller 513 generates the second gain control signal so that the gain controller 525 maintains an output of the dedicated control channel to be "0". That is, the modem controller 513 generates the first gain control signal (Gc=predefined gain) when there is the control message to transmit, and generates the second gain control signal (Gc=0) when there is no control message to transmit. The gain controller 525 may be positioned following a spreading stage. However, in this case, there may arise a problem of PCB puncturing. Further, although the invention has been described with reference to an embodiment performing the DTX mode for the dedicated control channel using the gain controller 525, it is also possible to block the signal path using a switch when there is no control signal to transmit to the dedicated control channel.

FIGS. 5A and 5B illustrate the structure of the dedicated control channel transmission device for the forward link (from the base station to the mobile station). The dedicated control channel transmission device for the forward link should perform a PCB puncturing operation for controlling a transmission power of the mobile station. However, a dedicated control channel transmission device for the reverse link (from the mobile station to the base station) does not have to perform the PCB puncturing operation. Accordingly, the dedicated control channel transmission device for the reverse link can be constructed as shown in FIG. 6.

Figure 6:
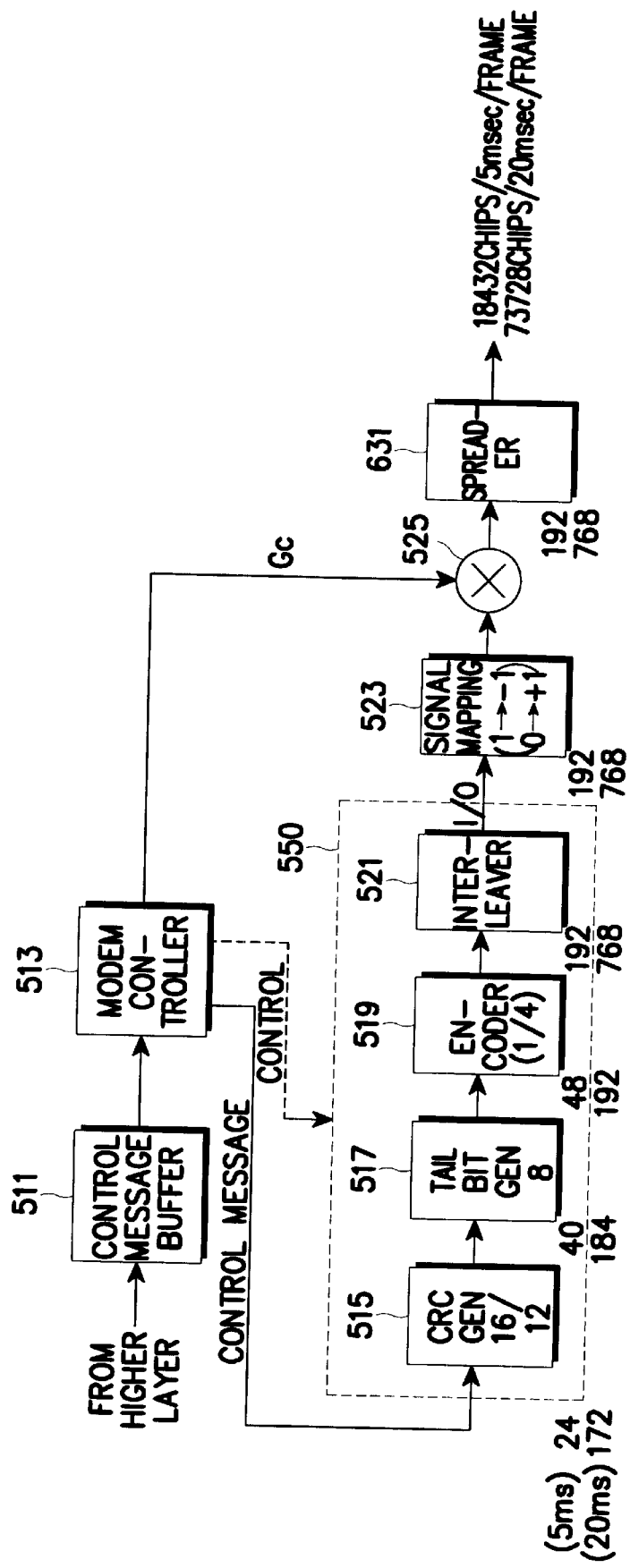
FIG. 6 is a diagram illustrating a transmission device for a reverse dedicated control channel in the mobile communication system according to the present invention.

Referring to FIG. 6, the dedicated control channel transmission device for the reverse link has the same structure as the dedicated control channel transmission device for the forward link, except for the S/P converter, the spreader structure, the encoding rate of the convolutional encoder. In the embodiment, the encoding rate of the forward link encoder is ⅓ and the encoding rate of the reverse link encoder is ¼.

In transmitting the control signal using the reverse dedicated control channel, the dedicated control channel transmission device for the reverse link also determines the frame length according to the size of the control message and transmits the control message by the determined frame length unit. Further, the dedicated control channel transmission device for the reverse link examines presence/absence of the control message to transmit through the reverse dedicated control channel, to suppress an output of the reverse dedicated control channel when there is no control signal to transmit and to form an output path for the reverse dedicated control channel only when there is an actual control message to transmit.

In FIG. 6, a spreader 631 spreads the control signal output through the dedicated control channel using the orthogonal code and the PN sequence.

A device for receiving the control signals transmitted through the forward or reverse dedicated control channel should determine the frame length of the control message to process the control message. The dedicated control channel reception device for the forward or reverse link can be constructed as shown in FIGS. 7A and 7B.

Figure 7A:
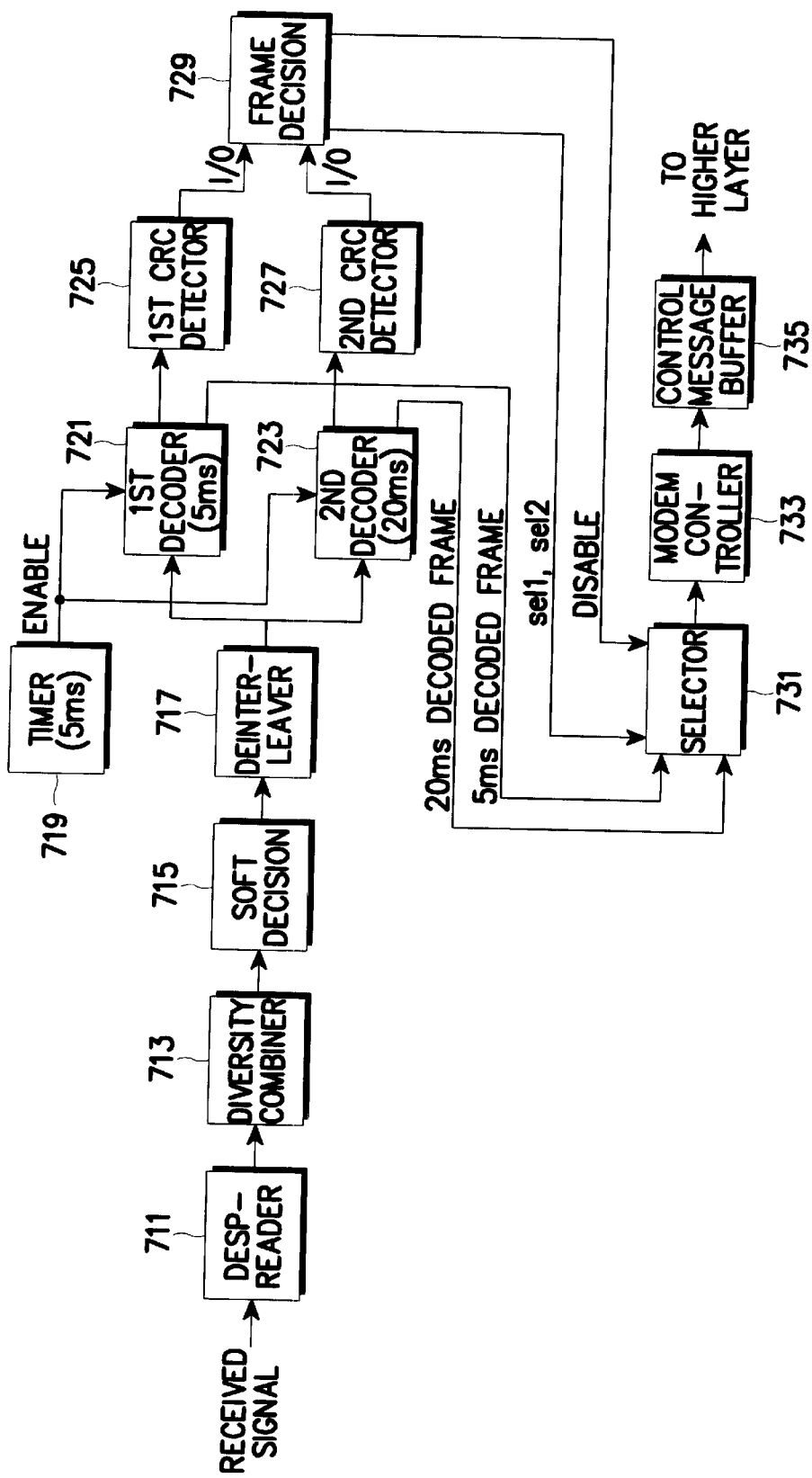
FIGS. 7A and 7B are diagrams illustrating reception devices for the dedicated control channel in the mobile communication system according to different embodiments of the present invention.
Figure 7B:
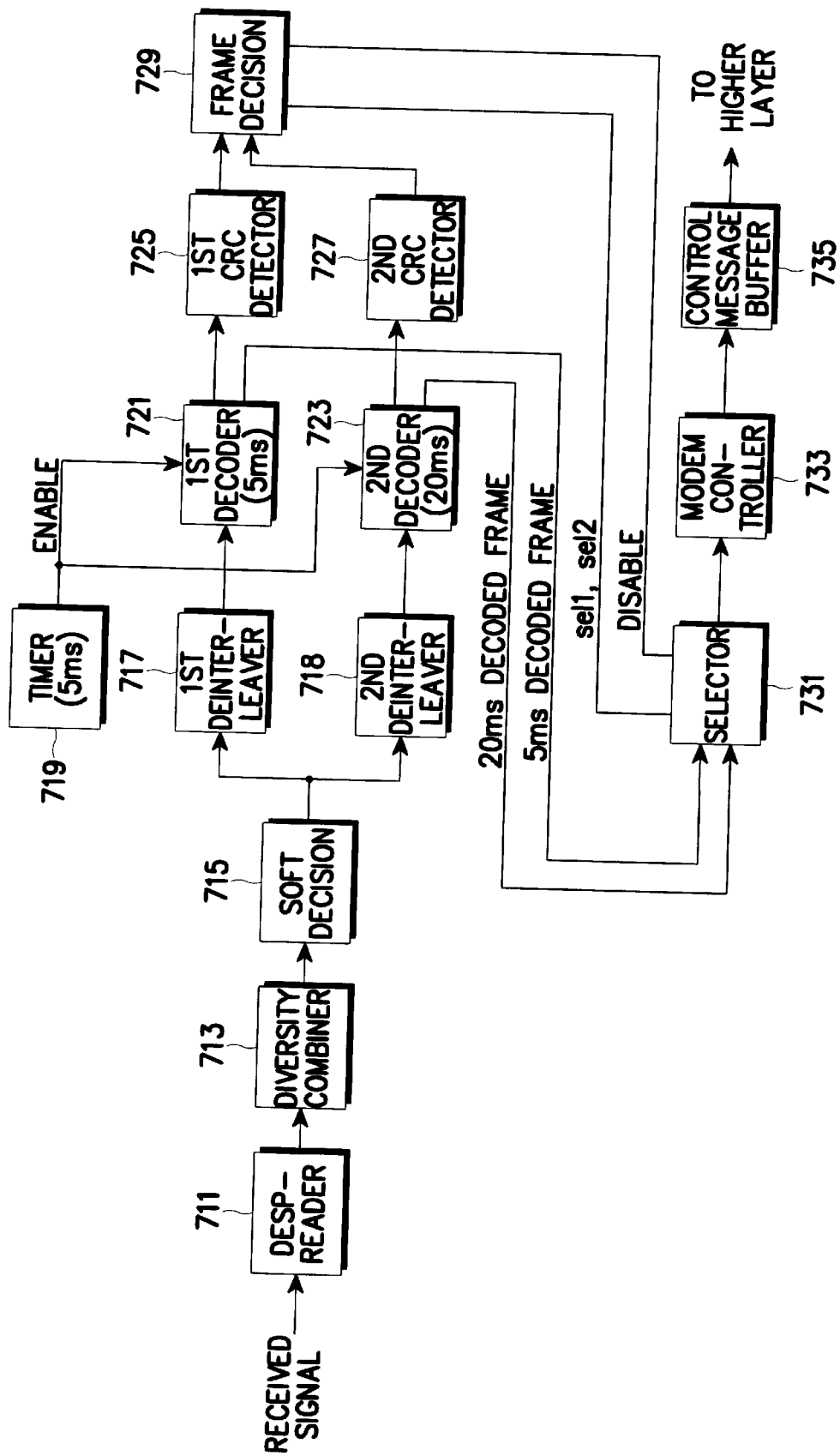

FIGS. 7A and 7B illustrate the dedicated control channel reception devices for the forward or the reverse link according to the present invention. The reception devices determine the frame length and whether or not the frame is being transmitted by detecting the CRC bits of the received control message.

Referring to FIG. 7A, a despreader 711 despreads a received signal using a PN sequence and an orthogonal code to receive a dedicated control channel signal. A diversity combiner 713 combines the signals, received through multiple paths, output from the despreader 711. A soft decision generator 715 quantizes the received signal into a digital value of several levels to decode the received signal. A deinterleaver 717 deinterleaves the coded symbols interleaved during transmission to rearrange the symbols in the original state. Here, the deinterleaver 717 should be able to deinterleave both the 5 ms frame and the 20 ms frame, in order to deinterleave them in the same manner as the interleaver in the dedicated control channel transmission device.

Therefore, as shown in FIG. 7B, it is also possible to use two deinterleavers. In FIG. 7B, a first deinterleaver 717 deinterleaves the interleaved frame data in the same manner as the 5 ms frame interleaver of the dedicated control channel transmission device. Similarly, a second deinterleaver 718 deinterleaves the interleaved frame data in the same manner as the 20 ms frame interleaver of the dedicated control channel transmission device.

A timer 719 generates a control signal for decoding the data received through the dedicated control channel at fixed periods. Here, the timer 719 is a 5 ms timer. A first decoder 721 is enabled by the control signal output from the timer 719 and decodes the deinterleaved data output from the first deinterleaver 717. The first decoder 721 decodes the first control message of 5 ms. A second decoder 723 is enabled by the control signal output from the timer 719 and decodes the deinterleaved data output from the second deinterleaver 718. The second decoder 723 decodes the second control message of 20 ms. A first CRC detector 725 receives an output of the first decoder 721 and checks the CRC for the 5 ms frame. A second CRC detector 727 receives an output of the second decoder 723 and checks the CRC for the 20 ms frame. Here, the first and second CRC detectors 725 and 727 output a true signal "1" or a false signal "0" as the result signal.

A frame decision block 729 analyzes the result signals output from the first and second CRC detectors 725 and 727 to decide the frame length of the control message received through the dedicated control channel. The frame decision block 729 generates a select signal sel1 for selecting the first decoder 721 when the first CRC detector 725 outputs the true signal, generates a select signal sel2 for selecting the second decoder 723 when the second CRC detector 727 outputs the true signal, and generates a DISABLE signal for shutting off the outputs of the first and second decoders 721 and 723 when the first and second CRC detectors 725 and 727 both generate the false signal.

A selector 731 selects the decoded data output from the first and second decoders 721 and 723 according to the output signals of the frame decision block 729. That is, the selector 731 selects the output of the first decoder 721 when the received frame is a 5 ms frame, selects the output of the second decoder 723 when the received frame is a 20 ms frame, and shuts off the outputs of both the first second decoders 721 and 723 for the period in which the control message is not received.

A modem controller 733 stores the received control message of the decoded data output from the selector 731 in a control message buffer 735. The upper layer processor then reads and processes the control message stored in the control message buffer 735.

Now, operation of the dedicated control channel reception device will be described hereinbelow with reference to FIGS. 7A and 7B. The despreader 711 receives the control signal through the dedicated control channel, and despreads the received control signal with the PN sequence. The control signals received through the dedicated control channel are restored to the original control message by way of the reverse process of transmission.

Thereafter, in the base station and the mobile station, the first decoder 721 decodes the 5 ms frames and the second decoder 723 decodes the 20 ms frames to process the control message. The first and second CRC detectors 725 and 727 then perform CRC checking for the decoded data output from the first and second decoders 721 and 723, respectively, and output the result values to the frame decision block 729. The frame decision block 729 then decides the frame length of the received control message and whether the frame is being transmitted or not, according to the CRC check results.

When it is assumed that CRC5 denotes the CRC check result for the 5 ms frame and CRC20 denotes the CRC check result for the 20 ms frame, the frame decision block 729 will generate the select signals as shown in Table 4.

TABLE 4

| CRC Detector | | Frame decision | | Decision |
|---|---|---|---|---|
| CRC5 | CRC20 | block | Selector | Results |
| True | False | sel1 | 1$^{st}$ Decoder Selected | 5 ms Frame |
| False | True | sel2 | 2$^{nd}$ Decoder Selected | 20 ms Frame |
| False | False | DISABLE | Decoder Output Off | No Frame |
| True | True | X | X | X |

As shown in Table 4, when CRC5 and CRC20 are both not detected (i.e., false), the frame data is not received, which corresponds to a duration where the transmission device does not transmit the control message in the discontinuous transmission mode. However, when CRC5 and CRC20 are both detected (i.e., true), a frame error occurs.

During transmission, the radio signal may include impulse noises due to other electronic equipments and the power line. In this case, the reception device of the mobile communication system may misconceive the noise components as to be the frame data. That is, there is a probability that the CRC detector will output a true signal as an output signal, even though the noise is received instead of the effective frame.

Figure 8:
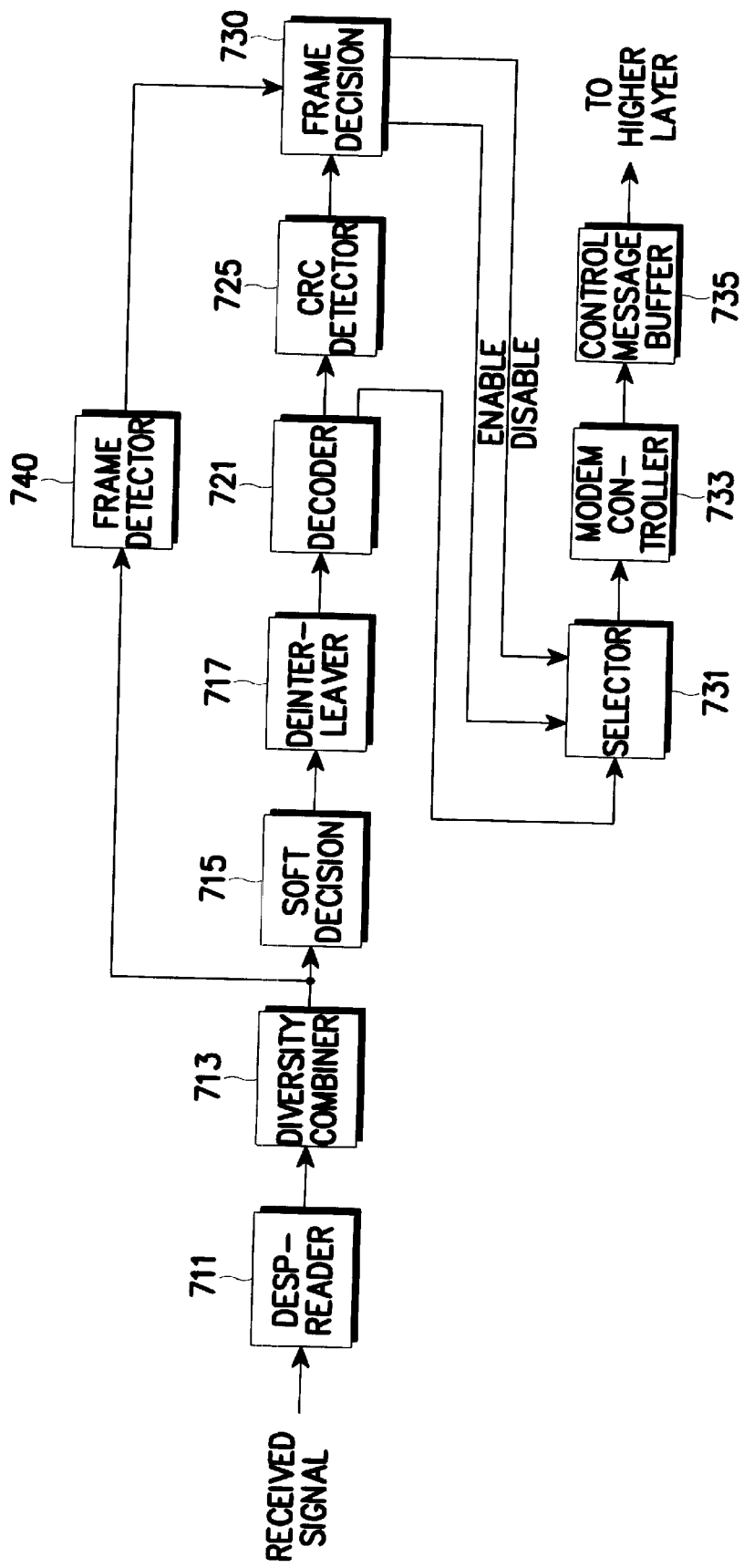
FIG. 8 is a diagram illustrating a reception device, having a frame detector, for the dedicated control channel in the mobile communication system according to another embodiment of the present invention.
Figure 10:
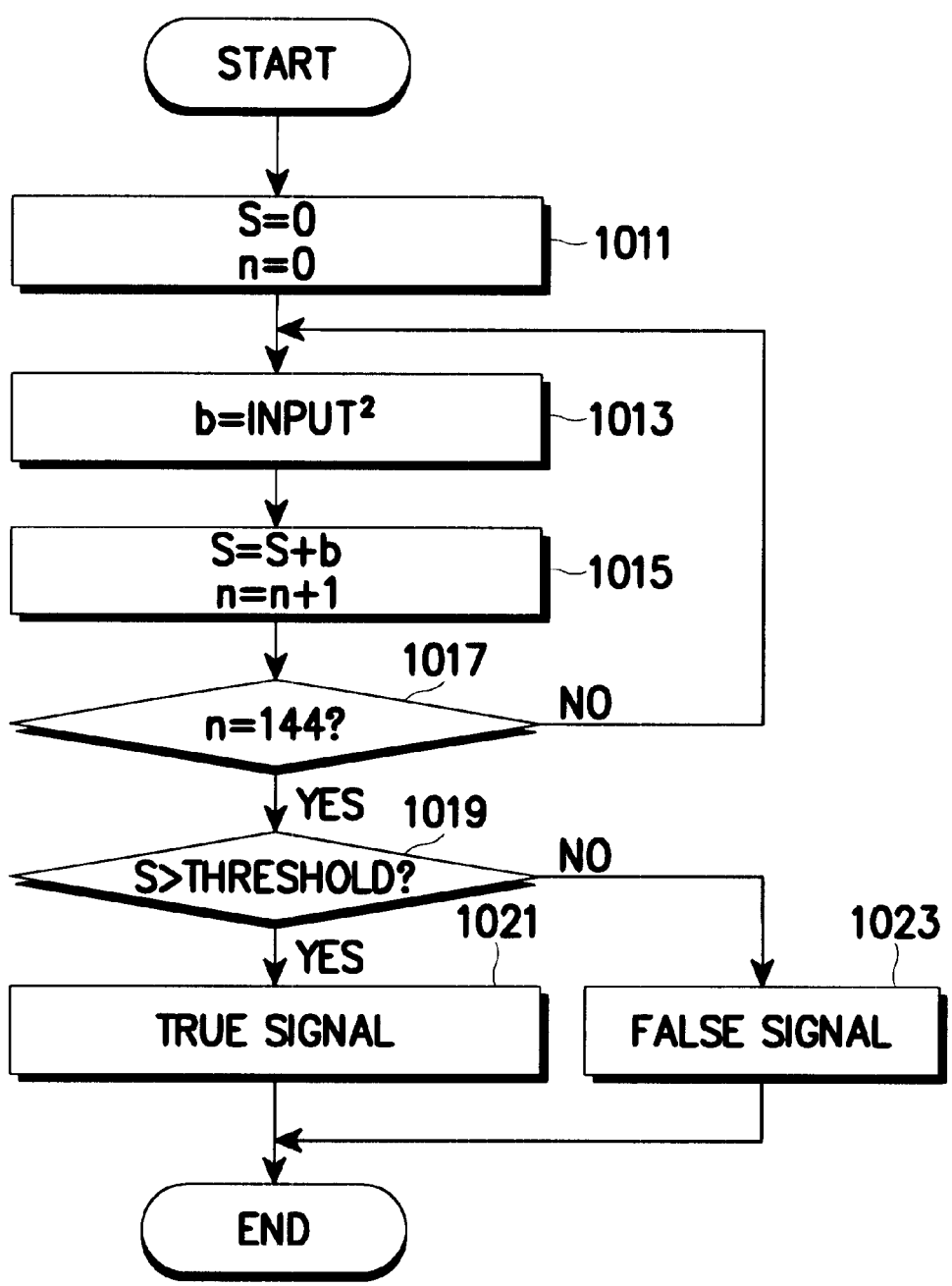
FIG. 10 is a flowchart illustrating a method for detecting an effective frame in a frame detector (740) of FIG. 8 and a first frame detector (743) of FIG. 9.

FIG. 8 illustrates a dedicated control channel reception device according to another embodiment of the present invention, which includes a frame detector for detecting an effective (or valid) frame of data when the transmission device of the mobile communication system discontinuously transmits the data of a single length frame. FIG. 10 is a flowchart illustrating a method for detecting the valid frame in the frame detector 740 of the reception device of FIG. 8.

For convenience of explanation, it is assumed that the size of the frame data transmitted from the transmission device is 5 ms long and the number of the decoded symbols output from the decoder is 144.

In FIG. 10, a register b stores a symbol energy value obtained by squaring an output of a diversity combiner 713 shown in FIG. 8, a register S accumulates the energy values output from the register b, and a register n stores the accumulated number of the input symbols. That is, the register b stores the energy value of the input symbols, and the register S accumulates the energy values of the symbols according to the number of the symbols stored in the register n.

Referring collectively to FIGS. 8 and 10, the received signal is despread in the despreader 711 and combined with the signals received through the multipath in the diversity combiner 713. A frame detector 740 then receives the combined signal output from the diversity combiner 713 and detects the valid frame by performing the procedure of FIG. 10, and outputs the true signal "1" or the false signal "0" according to the frame detection results.

Next, as shown in FIG. 10, the frame detector 740 initializes the register S and the register n (S=0 and n=0) in step 1011. After initialization, if the diversity combiner 713 generates an output, the frame detector 740 calculates in step 1013 the symbol energy value by squiring the output of the diversity combiner 713 and stores the value in the register b. The frame detector 740 updates in step 1015 the registers S by adding the value of the register b to the previous value of the register S and updates the number of the input symbols by increasing the value of the register n by one. After increasing the value of the register n, the frame detector 740 determined in step 1017 whether the value of the register n is 144. That is, since the 5 ms frame data is composed of 144 symbols, it is determined in the step 1017 whether the symbols of the 5 ms frame are completely received or not. When the value of the register n is smaller than 144 in step 1017, the frame detector 740 returns to step 1013 to repeat the procedure for detecting the energy value of the input symbols and accumulating the value of the register S, since reception of the 5 ms frame data is not yet completed.

In the meantime, if the value of the register n becomes 144, the frame detector 740 senses complete reception of the 5 ms frame data and compares in step 1019 the value accumulated at the register S with a threshold value. Here, the threshold value can be set to the minimum energy value of the 5 ms valid frame, and can be used as a reference value for deciding whether the 5 ms frame data is received or not. As the result of comparison, if the value of the register S is larger than the threshold value, the frame detector 740 proceeds to step 1021 to output the true signal to the frame decision block 730; if the value of the register S is smaller than the threshold value, the frame detector 740 advances to step 1023 to output the false signal to the frame decision block 730. When the false signal is applied to the frame decision block 730, the transmission device performs the discontinuous transmission mode to suppress transmission of the control message.

Figure 12:
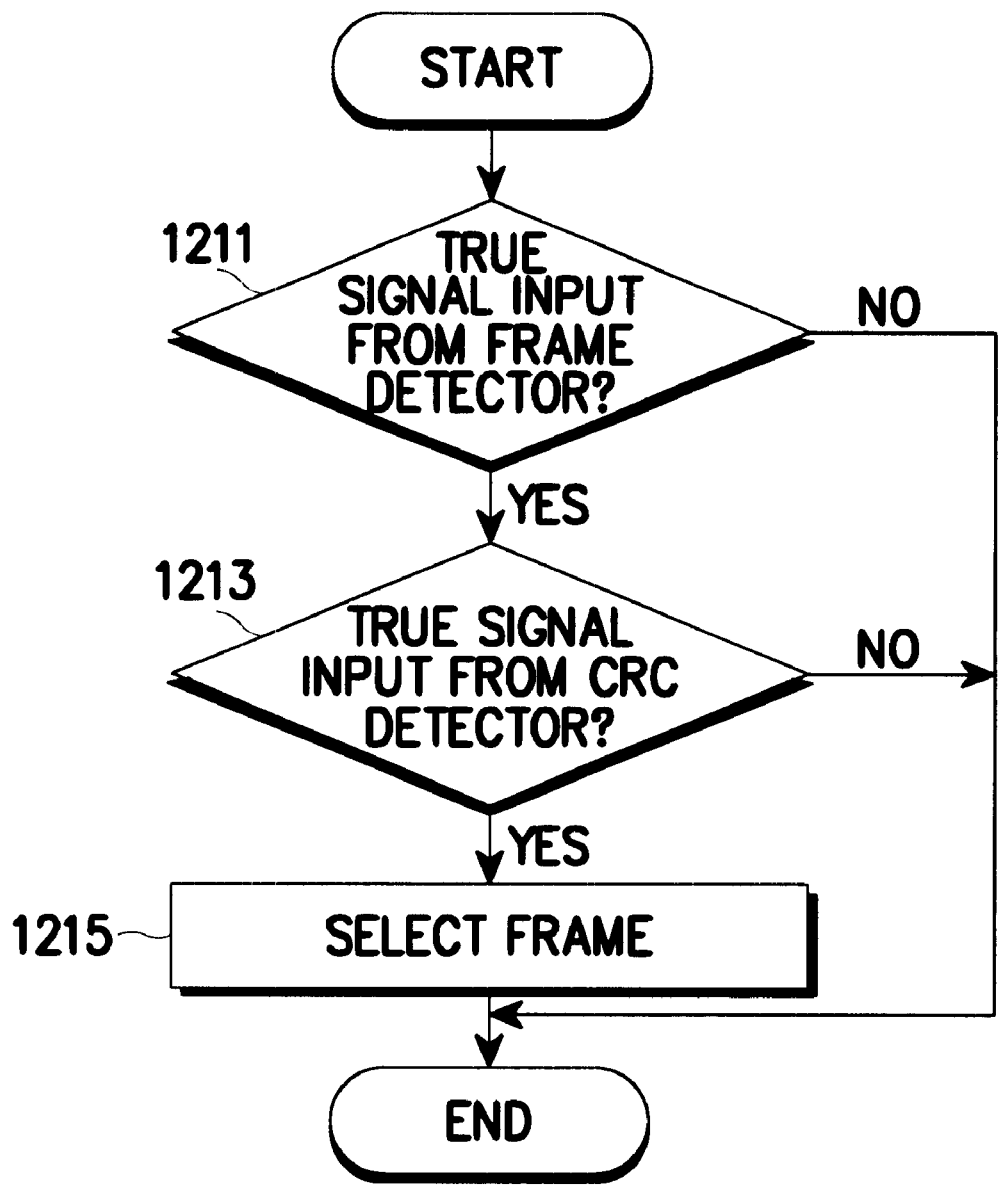
FIG. 12 is a flowchart illustrating a method for determining the length and presence of a frame in a frame decision block (730) of FIG. 8.

When the frame detector 740 generates the true signal or the false signal in accordance with the procedure of FIG. 10, the frame decision block 730 generates the control signal for selecting the frame length by performing the procedure shown in FIG. 12. FIG. 12 is a flowchart illustrating a method for deciding the length and presence of the frame in the frame decision block 730 of FIG. 8.

Referring to FIG. 12, the frame decision block 730 determines in step 1211 whether the frame detector 740 outputs the true signal. When a frame decision true signal is received, the frame decision block 730 checks in step 1213 whether the true signal is received from the CRC detector 725. If the true signal is received from the CRC detector 725 in step 1213, the frame decision block 730 generates an ENABLE signal to the selector 731 in step 1215, and then terminates the procedure. However, if the frame detection true signal is not received in step 1211, the frame decision block 730 generates the DISABLE signal to the selector 731 and terminates the procedure. In addition, when the signal output from the CRC detector 725 is not the true signal in step 1213, the frame decision block 730 generates the DISABLE signal to the selector 731 and terminates the procedure. Here, the frame decision block 730 can decide whether the frame data is received or not, depending on only the output of the frame detector 740.

The selector 731 then selects the output of the decoder 721 to provide it to the modem controller 733 or controls (shuts off) transmission of the output of the decoder 721, according to the ENABLE or DISABLE signal output from the frame decision block 730.

The descriptions of FIGS. 8, 10 and 12 are given on the assumption that the received frame is 5 ms frame. However, the frame detection and decision method stated above can be also applied to a frame having a different length, in the same manner. That is, for the case of the 20 ms frame, the deinterleaver 717, the decoder 721 and the CRC detector 725 of FIG. 8 are modified to receive and process the 20 ms frame, and the frame detector 740 detects the frame according to the procedure shown in FIG. 11. That is, for the case of the 20 ms frame, the number of the symbols output from the encoder of the transmission device is 576, so that the frame detector 740 accumulates the energy value of the symbols received during the 576 symbol duration and compares the accumulated value with the threshold value to determine whether the frame is detected or not. Here, the threshold value for the 20 ms frame can be set to the minimum energy value of the 20 ms valid frame, and can be used as a reference value for determining whether the 20 ms frame data is received or not.

Shown in Table 5 are decision results of the frame decision block 730 with respect to the output signals of the frame detector 740 and the CRC detector 725, based on the procedure of FIG. 12.

TABLE 5

| Frame Detector | CRC Detector | Frame Determiner | Selector | Decision Results |
| --- | --- | --- | --- | --- |
| False | False | Disable | Decoder Output Off | No Frame |
| False | True | Disable | Decoder Output Off | Error Frame |
| True | False | Disable | Decoder Output Off | Error Frame |
| True | True | Enable | Decoder Output On | Frame Received |

In Table 5, when the outputs of the frame detector 740 and the CRC detector 725 are both not the true signals, the frame decision block 730 decides that the message frame is not transmitted from the transmission device ("No Frame") or that the frame has an error ("Error Frame"). In the embodiment, when the outputs of the frame detector 740 and the CRC detector 725 are both the false signals, the frame decision block 730 decides that transmission device does not transmit the message frame; when one of the outputs of the frame detector 740 and the CRC detector 725 is the false signal, the frame decision block 730 decides that the corresponding message frame is an error frame.

Figure 9:
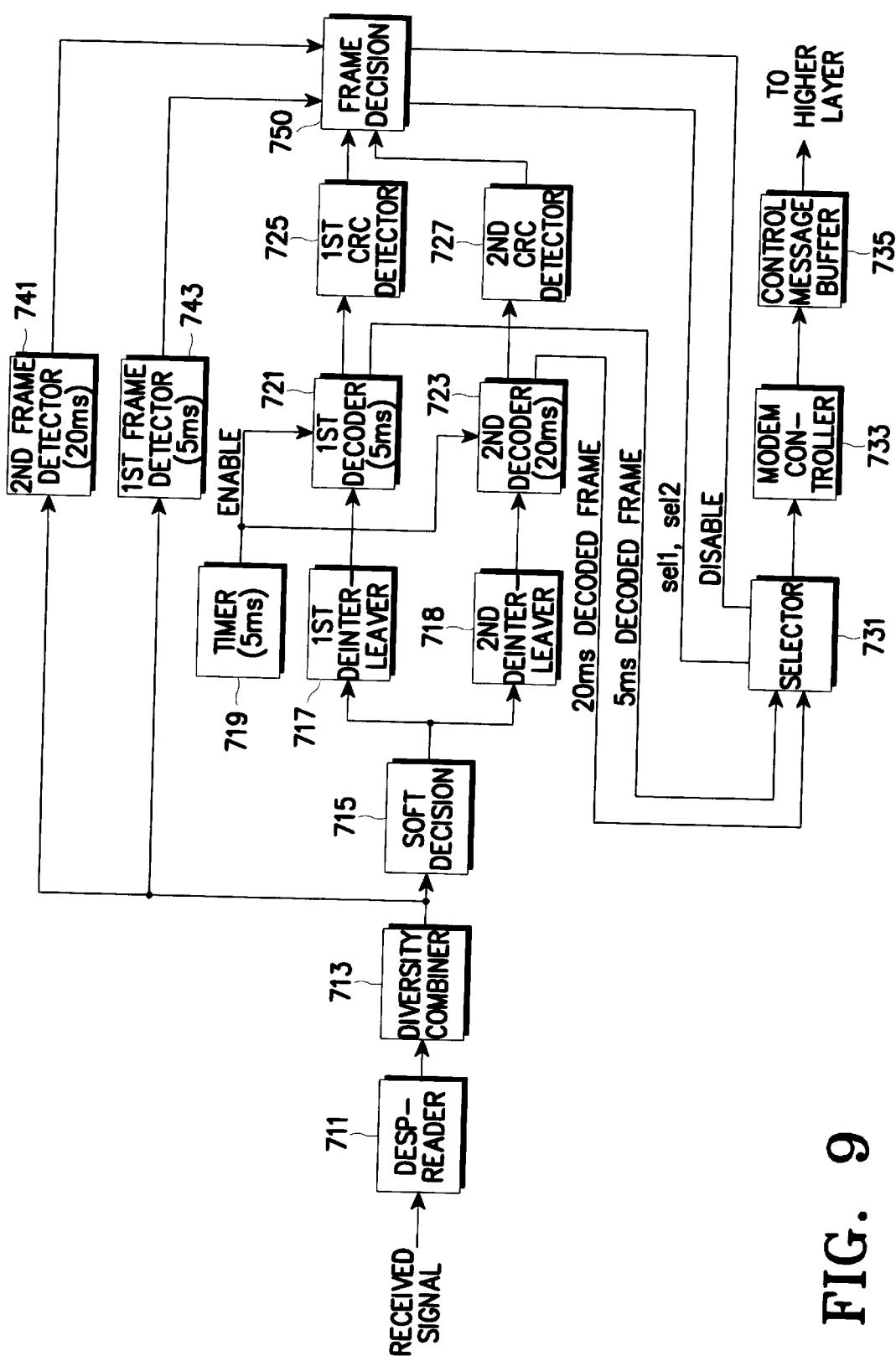
FIG. 9 is a diagram illustrating a reception device, having separate frame detectors, for the dedicated control channel in the mobile communication system according another embodiment of the present invention.
Figure 11:
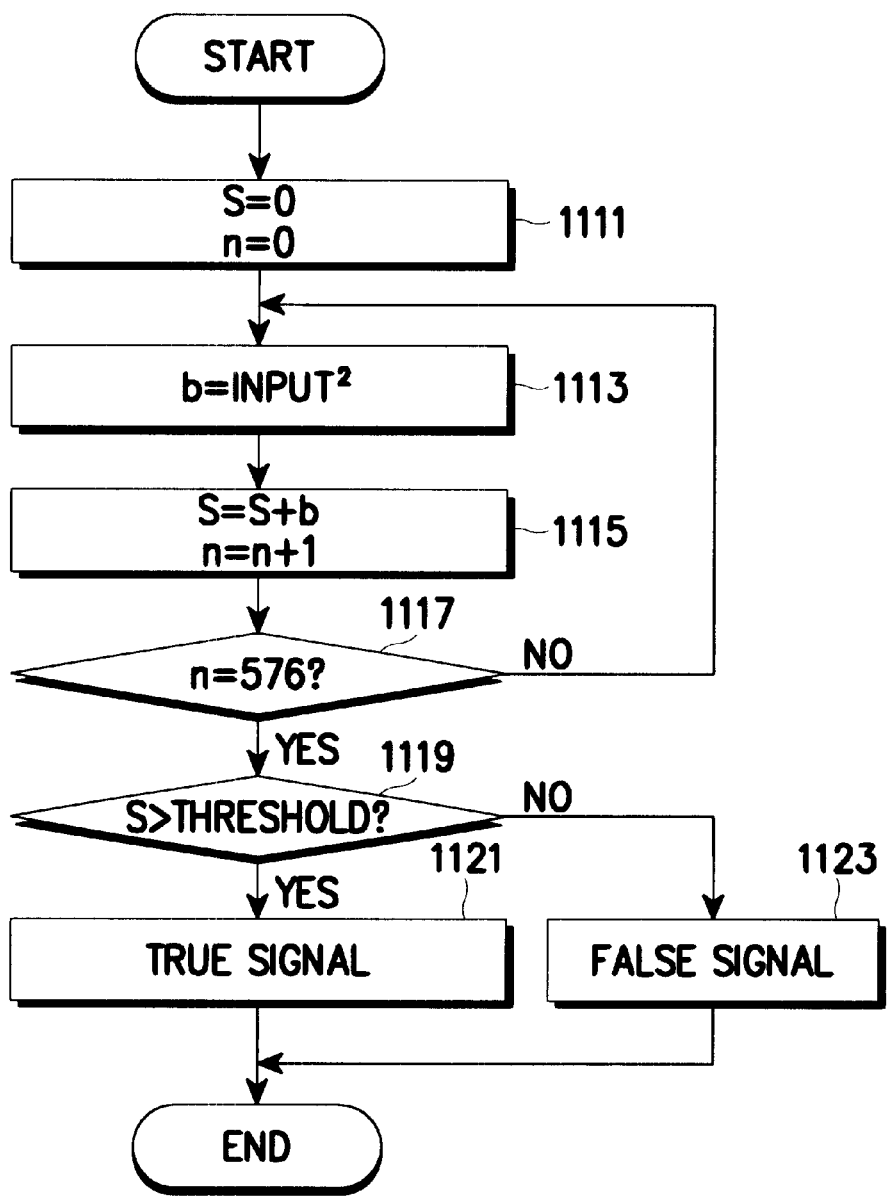
FIG. 11 is a flowchart illustrating a method for detecting the effective frame in a second frame detector (741) of FIG. 9.

FIG. 9 illustrates a reception device according to another embodiment of the present invention, which includes two frame detectors for detecting the frames having two different lengths. FIG. 11 is a flowchart illustrating a method for detecting the valid frame in a second frame detector 741 of FIG. 9.

In the following description, it is assumed that the first and second frames are 5 ms and 20 ms long, respectively. Further, the first frame of 5 ms and the second frame of 20 ms are composed of 144 symbols and 576 symbols, respectively.

Referring to FIG. 9, the reception device includes a first frame detector 743 and the second frame detector 741, to receive the frames having different lengths. The remaining structures are the same as those shown in FIG. 8. In FIG. 9, the first frame detector 743 is a 5 ms frame detector and the second frame detector 741 is a 20 ms frame detector. The first frame detector 743 performs the same operation as the frame detector 740 of FIG. 8, as shown in FIG. 10.

Likewise, the second frame detector 741 receives the output of the diversity combiner 713, detects the valid second frame according to the procedure of FIG. 11 and outputs the true or false signals according to the detection results. Referring to FIG. 11, steps 1111 to 1115 are identical to the steps 1011 to 1015 of FIG. 10. However, the second frame detector 741 repeats the steps 1113 and 1115 until the value of the register n becomes 576 in step 1117. Thereafter, in step 1119, the second frame detector 741 compares the accumulated value of the register S with the threshold value to determine whether the accumulated value of the register S is larger than the threshold value. As the result of comparison, if the value of the register S is larger than the threshold value, the second frame detector 741 outputs the true signal to the frame decision block 750, in step 1121; if the value of the register S is smaller than the threshold value, the second frame detector 741 proceeds to step 1123 and outputs the false signal to the fame length decision block 750.

Figure 13:
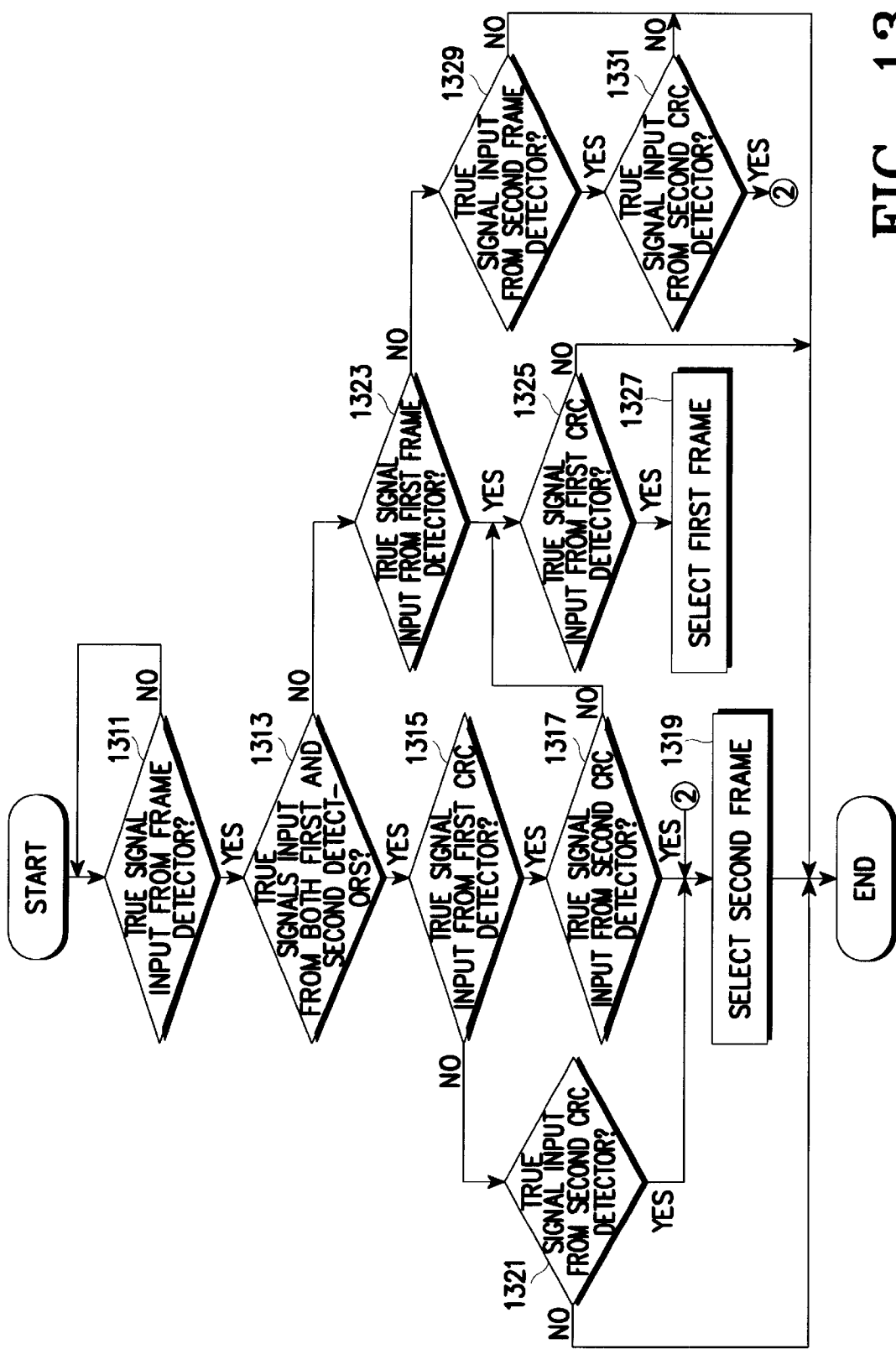
FIG. 13 is a flowchart illustrating a method for determining the length and presence of a frame in a frame decision block (750) of FIG. 9.

Upon reception of the true or false signal from the first and second frame detectors 743 and 741, the frame decision block 750 performs the procedure of FIG. 13. FIG. 13 is a flowchart illustrating a method for determining the frame length in the frame decision block 750 of FIG. 9.

Referring to FIG. 13, the frame decision block 750 examines in step 1311 whether the frame detection true signal is received from the first and the second frame detectors 743 and 741. If the frame detection true signal is received, the frame decision block 750 judges in step 1313 whether the frame detection true signals are received from both the first and second frame detectors 743 and 741. As the result of judgement, if the frame detection true signals are received from both the first and second frame detectors 743 and 741, the frame decision block 750 examines in step 1315 whether the first CRC detector 725 outputs the true signal. When the true signal is input from the first CRC detector 725, the frame decision block 750 advances to step 1317 to determine whether the second CRC detector 727 outputs the true signal. When the true signals are input from both the first and second CRC detectors 725 and 727, the frame decision block 750 generates the select signal sel2 to the selector 731 in step 1319, so that the selector 731 selects the frame output from the second decoder 723 and provides the selected frame to the modem controller 733.

However, when the signal output from the first CRC detector 725 is not the true signal in step 1315, the frame decision block 750 examines in step 1321 whether the signal output from the second CRC detector 727 is the true signal. As the result of examination, if the input signal is the true signal, the frame decision block 750 goes to the step 1319 and generates the select signal sel2 to the selector 731. The selector 731 then selects the output of the second decoder 723 in response to the select signal sel2 and outputs the selected signal to the modem controller 733. However, when the output signal of the second CRC detector 727 is the false signal in the step 1321, the selector 731 outputs the DISABLE signal and terminates the procedure. The selector 731 then selects none of the outputs of first and second decoders 721 and 723. Thus, there is no data delivered to the modem controller 733.

In addition, when the true signal is input from only one of the first and second frame detectors 743 and 741 in step 1313, the frame decision block 750 judges in steps 1323 and 1329 whether the input signal is received from the first frame detector 743 or the second frame detector 741. As the result of judgement, if the true signal is received from the first frame detector 743, the frame decision block 750 examines in step 1325 whether the first CRC detector 725 outputs the true signal. When the signal output from the first CRC detector 725 is the true signal, the frame decision block 750 generates the select signal sell to the selector 731, in step 1327. However, when the false signal is output from the first CRC detector 725, the frame decision block 750 generates the DISABLE signal. The selector 731 then selects the first frame output from the first decoder 721 to provide it to the modem controller 733 in response to the select signal sell, and shuts off the outputs of the first and second decoders 721 and 723 in response to the DISABLE signal.

Moreover, the frame decision block 750 determines in step 1329 whether the input true signal is received from the second frame detector 741. If so, the frame decision block 750 determines in step 1311 whether the second CRC detector 727 outputs the true signal. When the second CRC detector 727 outputs the true signal, the frame decision block 750 proceeds to step 1319 and generates the select signal sel2 to the selector 731. However, when the second CRC detector 727 outputs the false signal, the frame decision block 750 outputs the DISABLE signal to the selector 731. The selector 731 then selects the second frame output from the second decoder 723 to provide it to the modem controller 733 in response to the select signal sel2, and shuts off the outputs of the first and second decoders 721 and 723 in response to the DISABLE signal.

Shown in Table 6 are output signals of the frame detectors 741 and 743, the CRC detectors 725 and 727, and the frame decision block 750 in accordance with the procedure of FIG. 13.

TABLE 6

| 1st Frame Detector | 2nd Frame Detector | CRC Detector CRC5 | CRC Detector CRC20 | Frame Determiner | Decision Selector | Results |
|---|---|---|---|---|---|---|
| False | False | X | X | DISABLE | Decoder Output Off | False Frame |
| True | False | False | X | DISABLE | Decoder Output Off | False Frame |
| True | False | True | X | sel1 | 1st Decoder Selected | 5 ms Frame |
| False | True | X | True | sel2 | 2nd Decoder Selected | 20 ms Frame |
| False | True | X | False | DISABLE | Decoder Output Off | False Frame |
| True | True | X | True | sel2 | 2nd Decoder Selected | 20 ms Frame |

TABLE 6-continued

| 1st Frame Detector | 2nd Frame Detector | CRC Detector | | Frame Determiner | Selector | Decision Results |
|---|---|---|---|---|---|---|
| | | CRC5 | CRC20 | | | |
| True | True | True | False | sel1 | 1st Decoder Selected | 5 ms Frame |
| True | True | True | False | DISABLE | Decoder Output Off | False Frame |

In Table 6, the "False Frame" means that the transmission device does not transmit the message frame (i.e., "No Frame") or the frame has an error during transmission (i.e., "Error Frame"). In case of "False Frame", the frame decision block 750 examines the outputs of the frame detectors 741 and 743 and the CRC detectors 725 and 727 to determine whether "False Frame" corresponds to "No Frame" or "Error Frame". In the embodiment, the frame decision block 750 outputs the decision results according to the outputs of the frame detectors 741 and 743 and the CRC detectors 725 and 727, as shown in Table 7.

TABLE 7

| 1st Frame Detector | 2nd Frame Detector | CRC Detector | | Frame Determiner | Selector | Decision Results |
|---|---|---|---|---|---|---|
| | | CRC5 | CRC20 | | | |
| False | False | X | X | DISABLE | Decoder Output Off | No Frame |
| True | False | False | X | DISABLE | Decoder Output Off | Error Frame |
| True | False | True | X | sel1 | 1st Decoder Selected | 5 ms Frame |
| False | True | X | True | sel2 | 2nd Decoder Selected | 20 ms Frame |
| False | True | X | False | DISABLE | Decoder Output Off | Error Frame |
| True | True | X | True | sel2 | 2nd Decoder Selected | 20 ms Frame |
| True | True | True | False | sel1 | 1st Decoder Selected | 5 ms Frame |
| True | True | True | False | DISABLE | Decoder Output Off | Error Frame |

Figure 14:
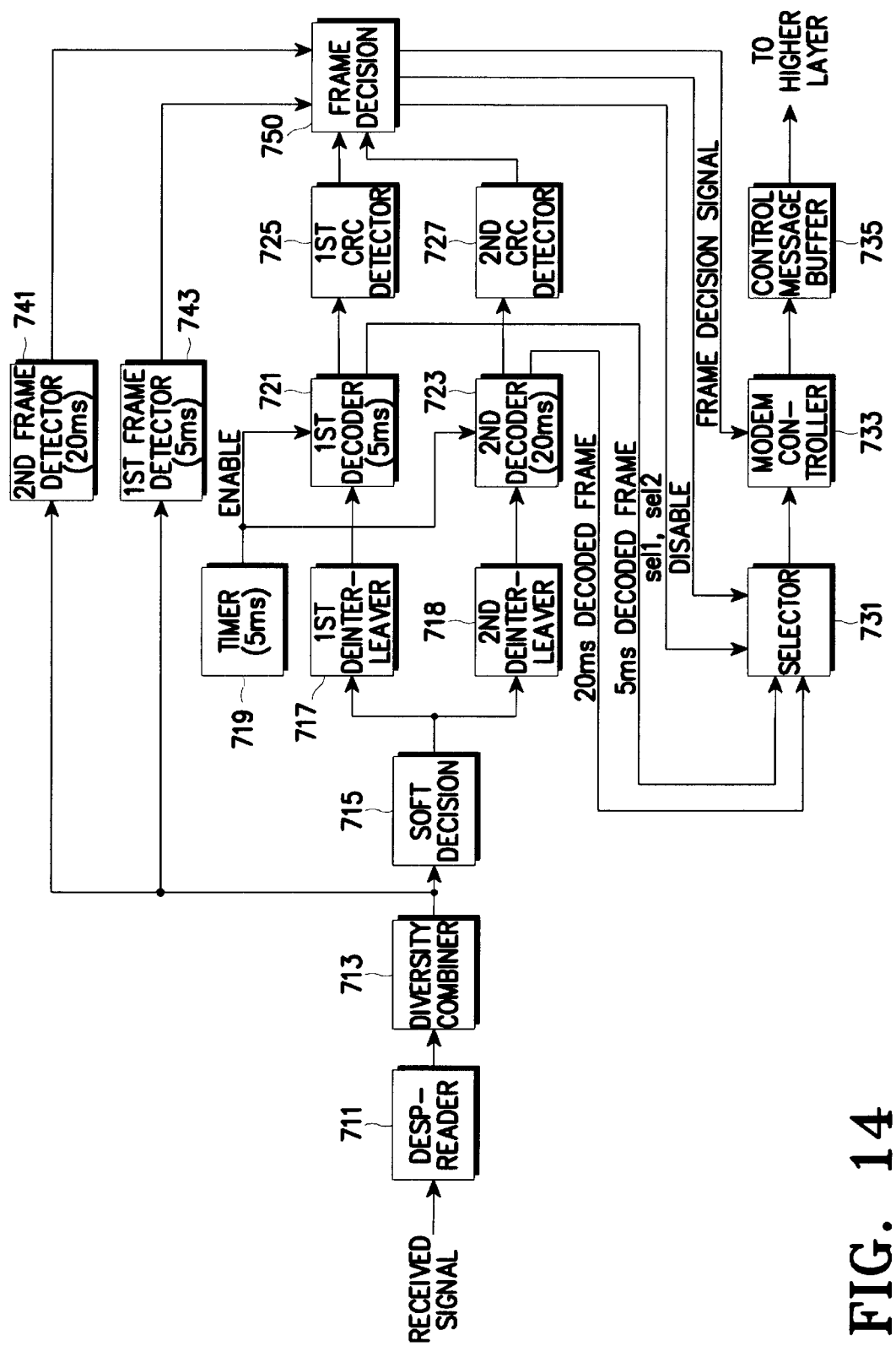
FIG. 14 is a diagram illustrating a reception device, having separate frame detectors, for the dedicated control channel in the mobile communication system according another embodiment of the present invention.

The outputs of the frame decision block 750 are delivered to the modem controller 733, as illustrated in FIG. 14.

Referring to FIG. 14, when the frame decision block 750 generates the select signal sel1 or sel2, the selector 731 selects the decoded message for the frame corresponding to the select signal and outputs the selected message to the modem controller 733. The modem controller 733 then delivers the received message to the upper processor. However, when the frame decision block 750 generates the DISABLE signal, the selector 731 blocks the output path for the decoded message. In this case, the modem controller 733 examines a frame decision signal output from the frame decision block 750. When the frame decision signal represents "No Frame", the modem controller 733 does not deliver the decision result to the upper layer on the judgement that there is no message transmitted from the transmission device. However, when the frame decision signal represents "Error Frame", the modem controller 733 delivers the decision result to the upper processor on the judgment that the transmission device has transmitted a message but the message has an error during transmission. Therefore, the upper processor may take a proper action on the error frame.

Figure 15:
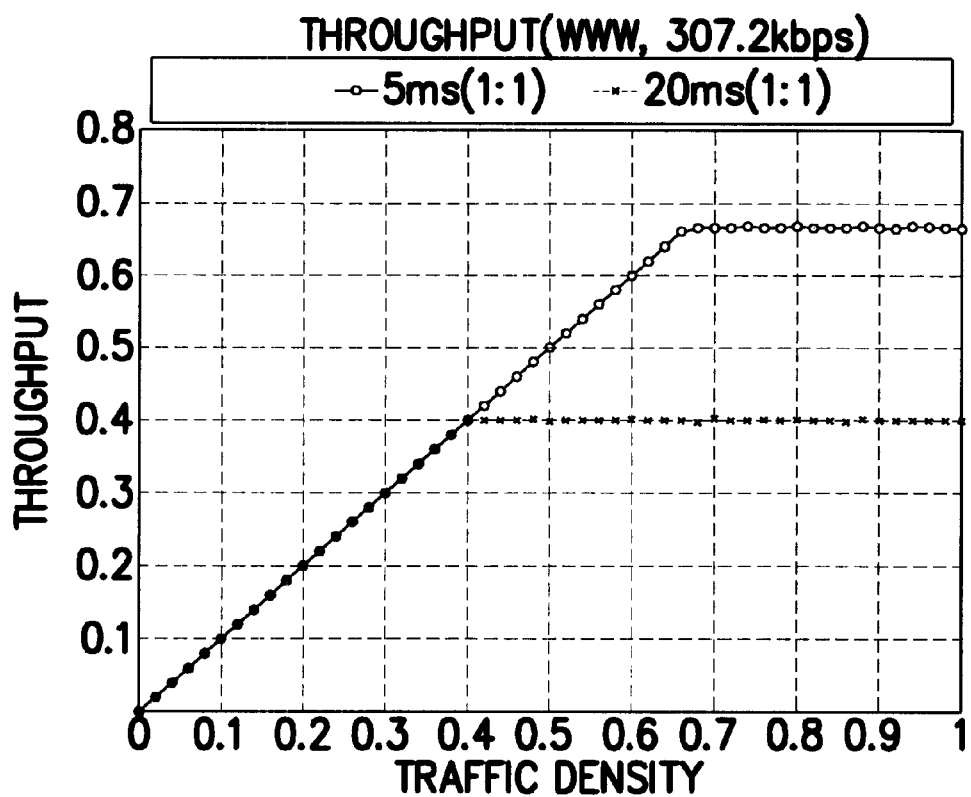
FIG. 15 is a diagram illustrating a simulation result for the control messages having frame lengths of 5 ms and 20 ms according to the present invention.

FIG. 15 illustrates a simulation result for processing control messages having a variable frame length through the dedicated control channel according to the present invention. Referring to FIG. 15, shown is a comparison result between the throughputs when the 5 ms frame is used and when the 20 ms frame is used for the dedicated control channel. Here, the forward packet traffic channel has a data rate 307.2 Kbps, the 20 ms fixed frame and 1% FER (Frame Error Rate).

As described above, the CDMA mobile communication system according to the present invention has the following advantages:

(1) The control message transmitted to the dedicated control channel has a length which is a function of the size of the control message, so that the throughput may be increased and the traffic delay may be decreased by utilization of the dedicated control channel;

(2) Use of the dedicated control channel is discontinuously controlled according to presence/absence of the control message to transmit. Thus, the radio capacity may be increased by the DTX mode transmission;

(3) The system provides reliable transmission through faster error detection and correction, as compared with the IS-95 system. Further, the system effectively uses the radio resources through utilization of an optimal channel environment and can provide improved voice service through use of the dedicated control channel, rendering it possible to effectively support the IS-95 message; and (4) In the CDMA mobile communication system, it is possible to reduce the probability of receiving error frames by using both the energy measurement result for the frame and the error detection result.

While the invention has been shown and described with reference to a certain preferred embodiment thereof, it will be understood by those skilled in the art that various changes in form and details may be made therein. For instance, while the invention is preferably practiced in a spread spectrum system having both voice and data communication capabilities, it is also applicable to a system with only data communication or data broadcasting capability or only voice communication capability. Further, the invention may be practiced in conjunction with other multiple access or spread spectrum communication techniques aside from CDMA. Accordingly, all such variations including those mentioned above are intended to be included within the scope and spirit of the invention as defined by the appended claims.

What is claimed is:

1. A CDMA (Code Division Multiple Access) system for transmitting messages having at least two different frame lengths, comprising:
    a controller for determining a frame length of a message to be transmitted and outputting a frame select signal corresponding to the determined frame length;
    at least one message generator for generating frame data of the message to be transmitted according to the frame select signal; and
    a transmitter for spreading the frame data and transmitting the spread frame data through a dedicated control channel.

2. The CDMA system as claimed in claim 1, wherein the message generator comprises:
    a CRC (Cyclic Redundancy Check) generator for generating CRC bits for the message in the frame length determined according to the frame select signal and adding the CRC bits to the message;
    a tail bit generator for generating tail bits and adding the generated tail bits to an output of the CRC generator;
    a channel encoder for encoding the tail bit-added frame data with a predetermined encoding rate; and
    an interleaver for interleaving the encoded message by a unit of the frame length determined according to the frame select signal.

3. The CDMA system as claimed in claim 1, wherein the message frame includes a 5 ms frame and a 20 ms frame.

4. The CDMA system as claimed in claim 1, wherein the message includes a user message, a signaling message and a MAC (Medium Access Control) message.

5. The CDMA system as claimed in claim 1, wherein the at least one message generator comprises a plurality N message generators, with N equaling the number of the frame lengths of the message to be transmitted and the respective message generators generate the frame data in the corresponding frame length, wherein each of the message generators comprises;
    a CRC generator for generating CRC bits for the message to be transmitted and adding the CRC bits to the message;
    a tail bit generator for generating tail bits and adding the generated tail bits to an output of the CRC generator;
    a channel encoder for encoding the tail bit-added frame data with a predetermined encoding rate; and
    an interleaver for interleaving the encoded message by a unit of the frame length determined according to the frame select signal.

6. The CDMA system as claimed in claim 1, wherein the controller comprises a device for generating an output control signal to perform a discontinuous transmission mode when there is no message to transmit, wherein the transmitter comprises a path controller for controlling an output of the dedicated control channel in response to the output control signal.

7. The CDMA system as claimed in claim 6, wherein the transmitter comprises:
    the path controller for receiving the frame data to be transmitted and blocking up an output path of the frame data in response to the output control signal;
    an orthogonal spreader for spreading the message frame output from the path controller with an orthogonal code for the dedicated control channel; and
    a PN (Pseudo Noise) spreader for spreading the orthogonally spread signal with a PN sequence.

8. The CDMA system as claimed in claim 7, wherein the path controller comprises a gain controller whose output gain becomes zero in response to the output control signal.

9. A method for transmitting messages having at least two different frame lengths in a CDMA system, comprising the steps of:
    determining a frame length of a message to be transmitted and outputting a frame select signal corresponding to the determined frame length, so as to transmit the message in a frame length selected from at least two different frame lengths;
    generating frame data of the message to be transmitted according to the frame select signal; and
    spreading the frame data and transmitting the spread frame data through a dedicated control channel.

10. The method as claimed in claim 9, wherein the frame data generating step comprises the steps of:
    generating CRC bits for the message to be transmitted and adding the CRC bits to the message;
    generating tail bits and adding the generated tail bits to the CRC bit-added message;
    encoding the tail bit-added frame data with a predetermined encoding rate; and
    interleaving the encoded message by a unit of the frame length determined according to the frame select signal.

11. The method as claimed in claim 9, wherein the message frame includes a 5 ms frame and a 20 ms frame.

12. The method as claimed in claim 9, wherein the message includes a user message, a signaling message and a MAC message.

13. The method as claimed in claim 9, further comprising the step of performing a discontinuous transmission mode to control an output of the dedicated control channel when there is no message to transmit.

14. The method as claimed in claim 13, wherein a transmission gain for the message is zero in the discontinuous transmission mode.

15. A CDMA system for receiving messages having at least two different frame lengths, comprising:
    a despreader for despreading a signal received through a dedicated control channel;
    a first message receiver for deinterleaving and decoding the despread signal in a first frame length to output a first message, and detecting a first CRC corresponding to the decoded signal;
    a second message receiver for deinterleaving and decoding the despread signal in a second frame length to output a second message, and detecting a second CRC corresponding to the decoded signal; and
    a controller for selecting one of the first and second messages according to first and second CRC detection results by the first and second message receivers.

16. The CDMA system as claimed in claim 15, wherein the controller comprises:
    a frame decider for analyzing the first and second CRC detection results to decide a frame length of the received message and output a frame length decision signal; and a selector for selecting one of the decoded signals output from the first and second message receivers according to the frame decision signal.

17. The CDMA system as claimed in claim 15, wherein the first and second frame lengths are 5 ms and 20 ms long, respectively.

18. A CDMA system for receiving messages having at least two different frame lengths, comprising:

a despreader for despreading a signal received through a dedicated control channel;

a frame detector for detecting an energy of the despread signal in first and second frame lengths and outputting first and second frame detection signals according to the detection results;

a first message receiver for deinterleaving and decoding the despread signal in the first frame length to output a first message;

a second message receiver for deinterleaving and decoding the despread signal in the second frame length to output a second message; and a controller for selecting one of the first and second messages according to the first and second detection results.

19. The CDMA system as claimed in claim 18, wherein the controller comprises:

a frame decider for analyzing the first and second frame detection results to decide a frame length of the received message and output a frame length decision signal; and a selector for selecting one of the decoded signals output from the first and second message receivers according to the frame decision signal.

20. The CDMA system as claimed in claim 18, wherein the first and second frame lengths are 5 ms and 20 ms long, respectively.

21. The CDMA system as claimed in claim 20, wherein the frame detector comprises first and second frame detectors;

wherein the first frame detector has as a reference value a minimum energy value of a 5 ms effective frame and compares an energy value of the received frame message with the minimum energy value of the 5 ms effective frame to generate a first frame detection signal when the energy value of the received frame message is higher than the minimum energy value of the 5 ms effective frame;

wherein the second frame detector has as a reference value a minimum energy value of a 20 ms effective frame and compares an energy value of the received frame message with the minimum energy value of the 20 ms effective frame to generate a second frame detection signal when the energy value of the received frame message is higher than the minimum energy value of the 20 ms effective frame.

22. A CDMA system for receiving messages having at least two different frame lengths, comprising:

a despreader for despreading a signal received through a dedicated control channel;

a first frame detector for detecting an energy of the despread signal in a first frame length to output a first frame detection signal according to the detection result;

a second frame detector for detecting an energy of the despread signal in a second frame length to output a second frame detection signal according to the detection result;

a first message receiver for deinterleaving and decoding the despread signal in the first frame length to output a first message and detecting a first CRC corresponding to the decoded signal to output a first CRC detection signal;

a second message receiver for deinterleaving and decoding the despread signal in the second frame length to output a second message and detecting a second CRC corresponding to the decoded signal to output a second CRC detection signal; and a controller for selecting one of the first and second messages according to the first and second frame detection results and the first and second CRC detection results.

23. The CDMA system as claimed in claim 22, wherein the first and second frame lengths are 5 ms and 20 ms long, respectively.

24. The CDMA system as claimed in claim 23, wherein the controller comprises:

a frame decider for analyzing the first and second CRC detection signals and the first and second frame detection signals, judging the received frame to have the second frame length when the second CRC detection signal and the second frame detection signal are received, judging the received frame to have the first frame length when the first CRC detection signal and the first frame detection signal are received, and judging the received frame to be an error frame when other CRC and frame detection signals are received; and a selector for outputting a corresponding one of the decoded signals output from the first and second message receivers upon receiving one of first and second frame length decision signals, and controlling an output of the decoded signal upon reception of an error frame decision signal.

25. The CDMA system as claimed in claim 24, wherein the frame decider judges that no frame is received when none of the first and second frame detection signals and none of the first and second CRC detection signals are received.

26. The CDMA system as claimed in claim 23, wherein the frame detector comprises first and second frame detectors;

wherein the first frame detector has as a reference value a minimum energy value of a 5 ms effective frame and compares an energy value of the received frame message with the minimum energy value of the 5 ms effective frame to generate a first frame detection signal when the energy value of the received frame message is higher than the minimum energy value of the 5 ms effective frame;

wherein the second frame detector has as a reference value a minimum energy value of a 20 ms effective frame and compares an energy value of the received frame message with the minimum energy value of the 20 ms effective frame to generate a second frame detection signal when the energy value of the received frame message is higher than the minimum energy value of the 20 ms effective frame.

27. A method for receiving messages having at least two different frame lengths in a CDMA system, comprising the steps of:

despreading a signal received through a dedicated control channel;

deinterleaving and decoding the despread signal in a first frame length to output a first message, and detecting a first CRC corresponding to the decoded signal;

deinterleaving and decoding the despread signal in a second frame length to output a second message, and detecting a second CRC corresponding to the decoded signal; and selecting one of the first and second messages according to the first and second CRC detection results.

28. A method for receiving messages having at least two different frame lengths in a CDMA system, comprising the steps of:

despreading a signal received through a dedicated control channel;

detecting an energy of the despread signal in first and second frame lengths and outputting first and second frame detection signals according to the detection results;

deinterleaving and decoding the despread signal in the first and second frame lengths to output first and second messages; and selecting one of the first and second messages according to the first and second frame detection results.

29. A method for receiving messages having at least two different frame lengths in a CDMA system, comprising the steps of:

despreading a signal received through a dedicated control channel;

detecting an energy of the despread signal in a first frame length to output a first frame detection signal according to the detection result;

detecting an energy of the despread signal in a second frame length to output a second frame detection signal according to the detection result;

deinterleaving and decoding the despread signal in the first frame length to output a first message and detecting a first CRC corresponding to the decoded signal;

deinterleaving and decoding the despread signal in the second frame length to output a second message and detecting a second CRC corresponding to the decoded signal; and selecting one of the first and second messages according to the first and second frame detection results and the first and second CRC detection results.

* * * * *

UNITED STATES PATENT AND TRADEMARK OFFICE
CERTIFICATE OF CORRECTION

PATENT NO.    : 6,438,119 B1
DATED         : August 20, 2002
INVENTOR(S)   : Young-Ky Kim et al.

It is certified that error appears in the above-identified patent and that said Letters Patent is hereby corrected as shown below:

<u>Title page,</u>
Item [30], should read as follows:

-- [30]      Foreign Application Priority Data

Feb. 14, 1998  (KR) ………………………….. 98-4498
  Apr. 18, 1998  (KR) ………………………….. 98-13958 --.

Signed and Sealed this

Twenty-ninth Day of April, 2003

JAMES E. ROGAN
*Director of the United States Patent and Trademark Office*